United States Patent
Da Silva et al.

(10) Patent No.: US 11,985,525 B2
(45) Date of Patent: May 14, 2024

(54) EARLY MEASUREMENT CONFIGURATION HANDLING IN 2-STEPS RESUME REQUEST-RELEASE

(71) Applicant: Telefonaktiebolaget LM Ericsson (publ), Stockholm (SE)

(72) Inventors: Icaro Leonardo Da Silva, Solna (SE); Patrik Rugeland, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 273 days.

(21) Appl. No.: 17/436,334

(22) PCT Filed: Feb. 18, 2020

(86) PCT No.: PCT/SE2020/050185
§ 371 (c)(1),
(2) Date: Sep. 3, 2021

(87) PCT Pub. No.: WO2020/180226
PCT Pub. Date: Sep. 10, 2020

(65) Prior Publication Data
US 2022/0182859 A1 Jun. 9, 2022

Related U.S. Application Data

(60) Provisional application No. 62/815,120, filed on Mar. 7, 2019.

(51) Int. Cl.
*H04W 4/00* (2018.01)
*H04W 24/08* (2009.01)
*H04W 52/02* (2009.01)

(52) U.S. Cl.
CPC ........ *H04W 24/08* (2013.01); *H04W 52/0209* (2013.01)

(58) Field of Classification Search
None
See application file for complete search history.

(56) References Cited

U.S. PATENT DOCUMENTS

2016/0081020 A1* 3/2016 Rahman ............... H04W 24/10 370/311
2019/0037425 A1 1/2019 Hong et al.

OTHER PUBLICATIONS

International Search Report and Written Opinion dated Jul. 27, 2020 for International Application No. PCT/SE2020/050185 filed Feb. 18, 2020, consisting of 20-pages.

(Continued)

*Primary Examiner* — Zewdu A Beyen
(74) *Attorney, Agent, or Firm* — Weisberg I.P. Law, P.A.

(57) ABSTRACT

Systems and methods are disclosed herein for handling measurement configurations for a power saving state and/or handling associated measurements, upon receiving a message from a network node while performing measurements in accordance with the measurement configurations while in the power saving state. Embodiments of a method performed by a wireless device in a cellular communications system are disclosed. In some embodiments, a method performed by a wireless device in a cellular communications system includes receiving at least one measurement configuration for a power saving state and performing measurements in the power saving state in accordance with the at least one measurement configuration. The method further includes, while performing the measurements in the power saving state, receiving a message from a network node and performing one or more actions to handle the at least one measurement configuration, the measurements, or both the measurement configuration and the measurements, upon receiving the message.

18 Claims, 17 Drawing Sheets

(56) References Cited

OTHER PUBLICATIONS

3GPP TS 36.331 V15.3.0; 3rd Generation Partnership Project; Technical Specification Group Radio Access Network; Evolved Universal Terrestrial Radio Access (E-UTRA); Radio Resource Control (RRC); Protocol specification (Release 15), Sep. 2018, consisting of 918-pages.

3GPP TSG-RAN#81 RP-182076; Title: WID on Multi-RAT dual-Connectivity and Carrier Aggregation enhancements (LTE_NR_DC_CA_enh-Core); Agenda Item: 9.2.2; Source: Ericsson, Nokia, Nokia Shanghai Bell, Huawei; Document for: Approval; Date and Location: Sep. 10-13, 2018, Gold Coast, Australia, consisting of 5-pages.

3GPP TSG-RAN#80 RP-181469; Title: New WID on DC and CA enhancements (NR_DCCA_Enh); Agenda Item: 9.2.2; Source: Ericsson, Nokia, Nokia Shanghai Bell, Huawei; Document for: Approval; Date and Location: Jun. 11-14, 2018, La Jolla, CA, USA, consisting of 5-pages.

3GPP TSG RAN WG2 #97 R2-1701604; Title: Open issues for QoE measurement collection; Agenda Item: 14.4 QoE Measurement collection for streaming in UTRAN; Source: Ericsson; Document for: Discussion; Date and Location: Feb. 13-17, 2017, Athens, Greece, consisting of 4-pages.

3GPP TSG WG2 NR AH 1807 R2-1810773; Title: CR Introducing Wis endorsed for ASN. 1 review of 36.331 REL-15 second drop; Source to WG: Samsung (rapporteur); Date and Location: Jul. 2-6, 2018, Montreal, Canada, consisting of 902-pages.

3GPP TSG RAN WG2 Meeting #105 R2-1900104; Title: Supporting early measurement reporting in NR; Agenda Item: 11.10.3; Source: Qualcomm Incorporated; WID/SID: LTE_NR_DC_CA_enh-Core—Release 16; Document for: Discussion and Decision; Date and Location: Feb. 25-Mar. 1, 2019, Athens, Greece, consisting of 6-pages.

3GPP TSG-RAN2 Meeting #105 R2-190XXXX; Title: CR-Miscellaneous non-controversial corrections; Source to WG: Ericsson (Rapporteur); Source to TSG: R2; Work Item Code: NR_newRAT-Core; Date and Location: Feb. 25-Mar. 1, 2019, Athens, Greece, consisting of 492-pages.

ETSI TS 138 331 V15.8.0; 5G; NR; Radio Resource Control (RRC); Protocol specification (3GPP TS 38.331 version 15.8.0 Release 15); Jan. 2020, consisting of 527-pages.

3GPP TSG-RAN2 Meeting #105 R2-1902680; Title: CR for Late drop capabilities; Source to WG: Ericsson; Source to TSG: R2; Work Item Code: NR_newRAT-Core; Date and Location: Feb. 25-Mar. 1, 2018, Athens, Greece, consisting of 913-pages.

3GPP TS 36.331 V15.8.0; 3rd Generation Partnership Project; Technical Specification Group Radio Access Network; Evolved Universal Terrestrial Radio Access (E-UTRA); Radio Resource Control (RRC); Protocol specification (Release 15), Dec. 2019, consisting of 964-pages.

Indian Office Action dated Mar. 7, 2022 for Application No. 202147044889 filed Oct. 4, 2021; consisting of 8 pages.

\* cited by examiner

NOTE: THE ACTION OF MOVING TO DORMANT IS CALLED "HYBERNATION"

3GPP Scenarios, LTE and NR Interworking Options

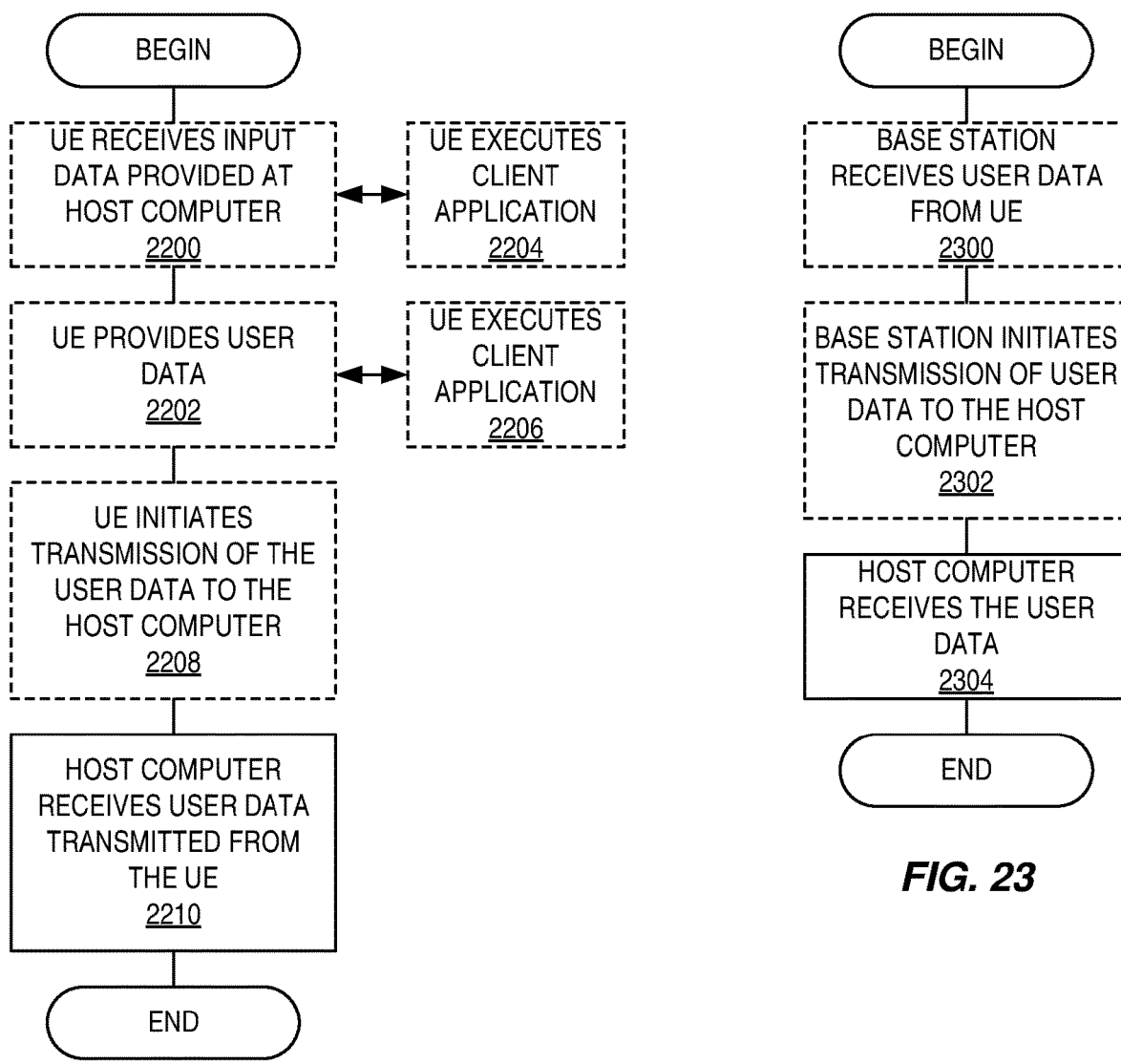

EARLY MEASUREMENT CONFIGURATION HANDLING IN 2-STEPS RESUME REQUEST-RELEASE

CROSS-REFERENCE TO RELATED APPLICATIONS

This application is a Submission Under 35 U.S.C. § 371 for U.S. National Stage Patent Application of International Application No.: PCT/SE2020/050185, filed Feb. 18, 2020 entitled "EARLY MEASUREMENT CONFIGURATION HANDLING IN 2-STEPS RESUME REQUEST—RELEASE," which claims priority to U.S. Provisional Application No. 62/815,120, filed Mar. 7, 2019, the entireties of both of which are incorporated herein by reference.

RELATED APPLICATIONS

This application claims the benefit of provisional patent application Ser. No. 62/815,120, filed Mar. 7, 2019, the disclosure of which is hereby incorporated herein by reference in its entirety.

TECHNICAL FIELD

The present disclosure relates to measurements performed by a wireless device while in a power savings state and, in particular, handling of a measurement configuration for measurements performed by a wireless device while in a power savings state.

BACKGROUND

Carrier Aggregation (CA) and Dual Connectivity (DC) in Long Term Evolution (LTE)

In Third Generation Partnership Project (3GPP) LTE Release 10, CA was introduced to enable the User Equipment (UE) to transmit and/or receive information via multiple cells, which are referred to as Secondary Cells (SCell(s), from multiple carrier frequencies to benefit of the existence of non-contiguous and contiguous carriers. In CA terminology, the Primary Cell (PCell) is the cell towards which the UE establishes the Radio Resource Control (RRC) connection or performs handover. In CA, cells are aggregated on the Medium Access Control (MAC) level. The MAC layer gets grants for a certain cell and multiplexes data from different bearers to one transport block being sent on that cell, as illustrated in FIG. 1. Also, the MAC layer controls how that process is done.

SCells can be "added" for the UE using RRC signaling (e.g., RRCConnectionReconfiguration), which takes in the order of hundreds of milliseconds. Note that "adding" an SCell is also referred to as "configuring" the SCell. A cell which is configured for the UE becomes a "serving cell" for this UE. An SCell may also be associated with an SCell state. When configured/added via RRC signaling, an SCell starts in a deactivated state. In LTE Release 15, the enhanced or evolved Node B (eNB) can indicate to activate-upon-configuration, or change the state, at least in RRCReconfiguration, as shown in the excerpt below from 3GPP Technical Specification (TS) 36.331 V15.3.0:

```
1>  for each SCell configured for the UE other than the PSCell:
   2>     if the received RRCConnectionReconfiguration message includes sCellState
          for the SCell and indicates activated:
      3>     configure lower layers to consider the SCell to be in activated state;
   2>     else if the received RRCConnectionReconfiguration message includes
          sCellState for the SCell and indicates dormant:
      3>     configure lower layers to consider the SCell to be in dormant state;
   2>     else:
      3>     configure lower layers to consider the SCell to be in deactivated state;
```

In LTE Release 15, a new intermediate state between the deactivated and active state has been introduced for enhanced uplink operation. A MAC Control Element (CE) can be used to change the SCell state between the three states as shown in FIG. 2. There are also timers in the MAC layer to move a cell between the deactivated, activated, and dormant states. These timers are:

sCellHibernationTimer, which moves the SCell from activated state to dormant state, sCellDeactivationTimer, which moves the SCell from activated state to deactivated state, and dormantSCellDeactivationTimer, which moves the SCell from dormant state to deactivated state.

The MAC level SCell activation takes on the order of 20-30 milliseconds (ms).

Once the network understands the need to configure and/or activate CA, the question is which cells to initially configure and/or activate, if they are configured, and/or whether a cell/carrier is good enough in terms of radio quality/coverage (e.g., Reference Signal Receive Power (RSRP) and Reference Signal Receive Quality (RSRQ)). To understand the conditions on SCell(s) or potential SCell(s) in a given available carrier, the network may configure the UE to perform Radio Resource Management (RRM) measurements.

Typically, the network may be assisted by RRM measurements to be reported by a UE. The network may configure the UE with measurement identities (IDs) associated to reportConfig with event A1 (serving cell becomes better than threshold) in case this is a configured SCell, or A4 (neighbor cell becomes better than threshold) for carriers without a configured SCell. The measurement objects are associated to the carrier on which the network wants reports. If the network is aware of the exact cells it wants the UE to measure, a so-called white cell list can be configured in the measurement object so that the UE is only required to measure these cells in that carrier.

FIG. 3 illustrates a process in which the network decides to setup CA or DC for a UE. The network then configures the UE to perform measurements, and the UE sends the appropriate measurement reports to the network. Based on the received measurement reports, the network makes a decision on SCell addition or SCell activation and then configures the UE to add the selected SCell(s).

With the introduction of DC in Release 12, it was possible to add what is called Secondary Cell Group (SCG) configuration to the UE. The main benefit would be that the UE could in principle add a cell from another eNB. Protocol-wise, that would require different MAC entities, one for each cell group. The UE will have two cell groups, one associated to the PCell (master node) and another associated to a Primary Secondary Cell (PSCell) (of the secondary eNB), where each group may possibly have their own associated SCells.

When it comes to adding SCells, when the UE is in single connectivity, the RRCConnectionReconfiguration message may carry a cell index (so MAC identifiers are optimized, i.e., shorter), cell identifier and carrier frequency, common parameters, and state information, introduced in Release 15 (activated or dormant).

Below excerpts from 3GPP TS 36.331 V15.3.0 illustrating and describing the SCellToAddModList included in the RRCConnectionReconfiguration are provided.

```
SCellToAddModList-r10 ::=          SEQUENCE (SIZE (1..maxSCell-r10)) OF
SCellToAddMod-r10
*
*
*
SCellToAddMod-r10 ::=              SEQUENCE {
    sCellIndex-r10                    SCellIndex-r10,
    cellIdentification-r10            SEQUENCE {
        physCellId-r10                    PhysCellId,
        dl-CarrierFreq-r10                ARFCN-ValueEUTRA
    }                                                     OPTIONAL,-- Cond
SCellAdd
    radioResourceConfigCommonSCell-r10    RadioResourceConfigCommonSCell-r10
    OPTIONAL,    -- Cond SCellAdd
    radioResourceConfigDedicatedSCell-r10 RadioResourceConfigDedicatedSCell-r10
    OPTIONAL,    -- Cond SCellAdd2
    ...,
    [[ dl-CarrierFreq-v1090            ARFCN-ValueEUTRA-v9e0   OPTIONAL -- Cond
EARFCN-max
    ]],
    [[ antennaInfoDedicatedSCell-v10i0    AntennaInfoDedicated-v10i0 OPTIONAL-
- Need ON
    ]],
    [[ srs-SwitchFromServCellIndex-r14    INTEGER (0.. 31) OPTIONAL -- Need ON
    ]],
    [[ sCellState-r15                  ENUMERATED {activated, dormant}OPTIONAL
    -- Need ON
    ]]
}
*
*
*
```

RRCConnectionReconfiguration field descriptions sCellConfigCommon
Indicates the common configuration for the SCell group.
sCellGroupIndex
Indicates the identity of SCell groups for which a common configuration is provided.
sCellIndex -continued In case of DC, the SCellIndex is unique within the scope of the UE i.e. an SCG cell can not use the same value as used for an MCG cell. For pSCellToAddMod, if sCellIndex-r13 is present the UE shall ignore sCellIndex-r12. sCellIndex-r13 in sCellToAddModListExt-r13 shall not have same values as sCellIndex-r10 in sCellToAddModList-r10.
sCellGroupToAddModList, sCellGroupToAddModListSCG
Indicates the SCell group to be added or modified. E-UTRAN only configures at most 4 SCell groups per UE over all cell groups.
sCellGroupToReleaseList
Indicates the SCell group to be released.
sCellState
A one-shot field that indicates whether the SCell shall be considered to be in activated or dormant state upon SCell configuration.
sCellToAddModList, sCellToAddModListExt
Indicates the SCell to be added or modified. Field sCellToAddModList is used to add the first 4 SCells for a UE with sCellIndex-r10 while sCellToAddModListExt is used to add the rest. If E-UTRAN includes sCellToAddModListExt-v1430 it includes the same number of entries, and listed in the same order, as in sCellToAddModListExt-r13. If E-UTRAN includes sCellToAddModList-v10l0 it includes the same number of entries, and listed in the same order, as in sCellToAddModList-r10. If E-UTRAN includes sCellToAddModListExt-v1370 it includes the same number of entries, and listed in the same order, as in sCellToAddModListExt-r13. If E-UTRAN includes sCellToAddModListExt-v13c0 it includes the same number of entries, and listed in the same order, as in sCellToAddModListExt-r13.
sCellToAddModListSCG, sCellToAddModListSCG-Ext
Indicates the SCG cell to be added or modified. The field is used for SCG cells other than the PSCell (which is added/ modified by field pSCellToAddMod). Field sCellToAddModListSCG is used to add the first 4 SCells for a UE with sCellIndex-r10 while sCellToAddModListSCG-Ext is used to add the rest. If E-UTRAN includes sCellToAddModListSCG-v10l0 it includes the same number of entries, and listed in the same order, as in sCellToAddModListSCG-r12. If E-UTRAN includes sCellToAddModListSCG-Ext-v1370 it includes the same number of entries, and listed in the same order, as in sCellToAddModListSCG-Ext-r13. If E-UTRAN includes sCellToAddModListSCG-Ext-v13c0 it includes the same number of entries, and listed in the same order, as in sCellToAddModListSCG-Ext-r13.
sCellToReleaseListSCG, sCellToReleaseListSCG-Ext
Indicates the SCG cell to be released. The field is also used to release the PSCell e.g. upon change of PSCell, upon system information change for the PSCell.

The procedure to add SCells to the Master Cell Group (MCG) in LTE (or to modify) is described as follows, as in TS 36.331 V15.3.0:

5.3.5.3    Reception of an RRCConnectionReconfiguration not including the mobilityControlInfo by the UE
If the RRCConnectionReconfiguration message does not include the mobilityControlInfo and the UE is able to comply with the configuration included in this message, the UE shall:
. . .
  1> if the received RRCConnectionReconfiguration includes the sCellToAddModList:
    2>    perform SCell addition or modification as specified in 5.3.10.3b;
. . .
5.3.10.3b    SCell addition/modification
The UE shall:
  1> for each sCellIndex value included either in the sCellToAddModList or in the sCellToAddModListSCG that is not part of the current UE configuration (SCell addition):
    2>    add the SCell, corresponding to the cellIdentification, in accordance with the radioResourceConfigCommonSCell and radioResourceConfigDedicatedSCell, both included either in the sCellToAddModList or in the sCellToAddModListSCG;
    2>    if sCellState is configured for the SCell and indicates activated:
      3>    configure lower layers to consider the SCell to be in activated state;
    2>    else if sCellState is configured for the SCell and indicates dormant:
      3>    configure lower layers to consider the SCell to be in dormant state;
    2>    else:
      3>    configure lower layers to consider the SCell to be in deactivated state;
    2>    for each measId included in the measIdList within VarMeasConfig:
      3>    if SCells are not applicable for the associated measurement; and
      3>    if the concerned SCell is included in cellsTriggeredList defined within the VarMeasReportList for this measId:
        4>remove the concerned SCell from cellsTriggeredList defined within the VarMeasReportList for this measId;

1> for each sCellIndex value included either in the sCellToAddModList or in the sCellToAddModListSCG that is part of the current UE configuration (SCell modification):
2> modify the SCell configuration in accordance with the radioResourceConfigDedicatedSCell, included either in the sCellToAddModList or in the sCellToAddModListSCG;

Inter-Radio Access Technology (RAT) and Inter Fifth Generation (5G) Core (5GC) Interworking in LTE and New Radio (NR)

5G in 3GPP introduces both a new core network, which is referred to as the 5GC, and a new Radio Access Network (RAN), which is referred to as NR. The 5GC will, however, also support RATs other than NR. It has been agreed that LTE (or Evolved Universal Terrestrial Radio Access (E-UTRA)) should also be connected to 5GC. LTE base stations (eNBs) that are connected to 5GC are called ng-eNBs and are part of Next Generation RAN (NG-RAN), which also includes NR base stations called gNBs. FIG. 4 shows how the base stations are connected to each other and the nodes in 5GC. In particular, FIG. 4 is the 5G System (5GS) architecture containing 5GC and NG-RAN.

There are different ways to deploy a 5G network with or without interworking with LTE (also referred to as E-UTRA) and Evolved Packet Core (EPC), as depicted in FIG. 5. In principle, NR and LTE can be deployed without any interworking, denoted by NR Stand-Alone (SA) operation, that is the gNB in NR can be connected to 5GC and the eNB can be connected to EPC with no interconnection between the two (Option 1 and Option 2 in FIG. 5). On the other hand, the first supported version of NR is the so-called Evolved Universal Terrestrial Radio Access Network (E-UTRAN) NR DC (EN-DC), illustrated by Option 3 in FIG. 5. In such a deployment, DC between NR and LTE is applied with LTE as the master and NR as the secondary node. The RAN node (gNB) supporting NR may not have a control plane connection to the core network (EPC); instead, the gNB relies on the LTE as master node (Master eNB (MeNB)). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, Option 2 in FIG. 5 supports stand-alone NR deployment where the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 are other variants of DC between LTE and NR which will be standardized as part of NG-RAN connected to 5GC, denoted by Multi-Radio DC (MR-DC). Under the MR-DC umbrella, we have:

EN-DC (Option 3): LTE is the master node and NR is the secondary node (EPC CN employed)
NR E-UTRA (NE)-DC (Option 4): NR is the master node and LTE is the secondary node (5GC employed)
Next Generation DC (NGEN-DC) (Option 7): LTE is the master node and NR is the secondary node (5GC employed)
NR-DC (variant of Option 2): DC where both the master and secondary nodes are NR (5GC employed).

As migration for these options may differ from different operators, it is possible to have deployments with multiple options in parallel in the same network, e.g. there could be an eNB base station supporting options 3, 5, and 7 in the same network as a NR base station supporting options 2 and 4. In combination with DC solutions between LTE and NR, it is also possible to support CA in each cell group (i.e., MCG and SCG) and DC between nodes on the same RAT (e.g., NR-NR DC). For the LTE cells, a consequence of these different deployments is the co-existence of LTE cells associated to eNBs connected to EPC, 5GC, or both EPC/5GC.

Suspend/Resume in LTE and Relation to CA/SCell and SCG Additions

A very typical scenario or use case is a UE with some burst traffic that comes and goes, e.g. some video packets and idle periods of transmission/reception, then comes live again. To save UE power, the network transitions the UE from connected to idle during these periods. Then, the UE comes back again (either via paging or UE request to get connected) and accesses the network.

In LTE Release 13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:
reduced latency, e.g., for smart phones accessing the Internet, and
reduced signaling leads to reduced battery consumption for machine type devices sending very little data.
The Release 13 solution is based on the UE sending a RRCConnectionResumeRequest message to the network and, in response, the UE may receive an RRCConnectionResume from the network. The RRCConnectionResume is not encrypted but integrity protected.

The resume procedure in LTE can be found in the RRC specifications (3GPP TS 36.331). As the UE performing resume is in RRC_IDLE (with suspended AS context), a transition from RRC_IDLE to RRC_CONNECTED is triggered. Hence, this is modelled in the specifications in the same subclause that captures the RRC connection establishment (i.e., 3GPP TS 36.331, subclause 5.3.3 RRC connection establishment).

There are few things relevant to highlight in the SCG configurations and SCell configurations for MCGs in relation to suspend/resume procedures. Upon suspension, it is defined that the UE stores its used RRC configuration. In other words, if the UE is operating in any DC mode (and has an SCG configuration) or has just configured SCells in the MCG, the UE stores all these configurations. However, upon resume, at least until Release 15, it is defined that the UE shall release the SCG configurations and SCell configurations, as shown in the excerpt from 3GPP TS 36.331 V15.3.0 below:

---

5.3.3.2 Initiation
The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.
. . .
Except for NB-IoT, upon initiating the procedure, if connected to EPC or 5GC, the UE shall:
   1> if the UE is resuming an RRC connection from a suspended RRC connection or from RRC_INACTIVE:
      2> if the UE is resuming an RRC connection from a suspended RRC connection:
         3> if the UE was configured with EN-DC:
           4>perform EN-DC release, as specified in TS 38.331 [82], clause 5.3.5.10;
      2> release the MCG SCell(s), if configured, in accordance with 5.3.10.3a;
. . .
      2> release the entire SCG configuration, if configured, except for the DRB configuration (as configured by drb-ToAddModListSCG);

---

Hence, when the UE comes from RRC_IDLE with the context, if the network wants to add SCell(s) to the MCG or add an SCG, the network needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network can speed up the setup of CA or DC. That solution is described below.

Existing Solution for Early Measurements Upon Idle to Connected Transition in LTE (Release 15)

In LTE Release 15, it is possible to configure the UE to report so-called "early measurements" upon the transition from idle to connected state. These measurements are measurements that the UE can perform in idle state and according to a configuration provided by the source cell. The intention is for the network to receive these measurements immediately after the UE is connected such that the network can quickly set up CA and/or other forms of DC (e.g., EN-DC, MR-DC, etc.) without the need for the network to first provide a measurement configuration (measConfig) in RRC_CONNECTED, as shown in previous sections, and then wait for hundreds of milliseconds until first samples are collected, monitored, and reported to the network.

In regarding to measurement configuration for early measurements upon resume in LTE, a first aspect of the existing solution, as standardized in 3GPP TS 36.331, is described in 5.6.20 Idle Mode Measurements. The UE can receive these idle mode measurement configurations in the system information (System Information Block 5 (SIB5)) in the field MeasIdleConfigSIB-r15, indicating up to 8 cells or ranges of cell IDs on which to perform measurements. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. An excerpt from 3GPP TS 36.331 V15.3.0 showing the broadcasted and dedicated signaling is provided below:

---

RRCConnectionRelease message

-- ASN1START
RRCConnectionRelease ::=                SEQUENCE {
   rrc-TransactionIdentifier           RRC-TransactionIdentifier,
   criticalExtensions                  CHOICE {
      c1                               CHOICE {
         rrcConnectionRelease-r8           RRCConnectionRelease-r8-IEs,
         spare3 NULL, spare2 NULL, sparel NULL
      },
      criticalExtensionsFuture         SEQUENCE { }
   }
}
*
*
*
RRCConnectionRelease-v1530-IEs ::=      SEQUENCE {
   drb-ContinueROHC-r15              ENUMERATED {true}           OPTIONAL, --
Cond UP-EDT
   nextHopChainingCount-r15          NextHopChainingCount        OPTIONAL, --
Cond UP-EDT
   measIdleConfig-r15                MeasIdleConfigDedicated-r15
   OPTIONAL, -- Need ON
   rrc-InactiveConfig-r15            RRC-InactiveConfig-r15      OPTIONAL, --
Need OR -continued

| | | |
|---|---|---|
| cn-Type-r15 | ENUMERATED {epc,fivegc} | OPTIONAL, -- Need OR |
| nonCriticalExtension | SEQUENCE { } | OPTIONAL |
| } | | |

\*
\*
\*

-- ASN1STOP

\*
\*
\*

---

MeasIdleConfig information element

```
-- ASN1START
MeasIdleConfigSIB-r15 ::= SEQUENCE {
   measIdleCarrierListEUTRA-r15   EUTRA-CarrierList-r15,
   ...
}
MeasIdleConfigDedicated-r15 :: = SEQUENCE {
   measIdleCarrierListEUTRA-r15      EUTRA-CarrierList-r15      OPTIONAL, -- Need OR
   measIdleDuration-r15              ENUMERATED {sec10, sec30, sec60, sec120,
                                                 sec180, sec240, sec300, spare},
   ...
}
EUTRA-CarrierList-r15 :: = SEQUENCE (SIZE (1..maxFreqIdle-r15)) OF MeasIdleCarrierEUTRA-r15
MeasIdleCarrierEUTRA-r15::=          SEQUENCE {
   carrierFreq-r15                   ARFCN-ValueEUTRA-r9,
   allowedMeasBandwidth-r15          AllowedMeasBandwidth,
   validityArea-r15                  CellList-r15               OPTIONAL, -- Need OR
   measCellList-r15                  CellList-r15               OPTIONAL, -- Need OR
   reportQuantities                  ENUMERATED {rsrp, rsrq, both},
   qualityThreshold-r15              SEQUENCE {
      idleRSRP-Threshold-r15            RSRP-Range             OPTIONAL, -- Need OR
      idleRSRQ-Threshold-r15            RSRQ-Range-r13         OPTIONAL -- Need OR
   }                                                            OPTIONAL, -- Need OR
   ...
}
CellList-r15 ::=   SEQUENCE (SIZE (1.. maxCellMeasIdle-r15)) OF PhysCellIdRange
-- ASN1STOP
```

MeasIdleConfig field descriptions allowedMeasBandwidth
If absent, the value corresponding to the downlink bandwidth indicated by the dl-Bandwidth included in MasterInformationBlock of serving cell applies.
carrierFreq
Indicates the E-UTRA carrier frequency to be used for measurements during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec10 correspond to 10 seconds, value sec30 to 30 seconds and so on.
qualityThreshold
Indicates the quality thresholds for reporting the measured cells for IDLE mode measurements.
reportQuantities
Indicates which measurment quantities UE is requested to report in the IDLE mode measurement report.
measCellList
Indicates the list of cells which the UE is requested to measure and report for IDLE mode measurements.
validityArea
Indicates the list of cells within which UE is requested to do IDLE mode measurements. If the UE reselects to a cell outside this list, the measurements are no longer required.

Carrier information and cell list: The UE is provided with a list of carriers and optionally with a list of cells on which the UE shall perform measurements. The fields s-NonIntraSearch in SystemInformationBlockType3 do not affect the UE measurement procedures in IDLE mode.

Timer T331: Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE performs measurements for the purpose of early measurements.

requested by the network. In addition, the UE may continue with IDLE mode measurements according to the broadcasted SIB5 configuration after the timer T331 has expired or stopped.

Minimum quality threshold: Notice also that only measurements above a certain threshold shall be stored as the cell candidates for CA setup need to be within a minimum acceptable threshold. How the UE performs measurements in IDLE mode is up to UE implementation as long as RAN4 requirements for measurement reporting defined in 36.133 are met.

The excerpt below from 3GPP TS 36.331 V15.3.0 shows the UE behavior in more detail:

---

5.6.20 Idle Mode Measurements
5.6.20.1    General
This procedure specifies the measurements done by a UE in RRC_IDLE when it has an IDLE mode measurement configuration and the storage of the available measurements by a UE in both RRC_IDLE and RRC_CONNECTED.
5.6.20.2    Initiation
While T331 is running, the UE shall:
   1> perform the measurements in accordance with the following:
      2>    for each entry in measIdleCarrierListEUTRA within VarMeasIdleConfig:
         3>    if UE supports carrier aggregation between serving carrier and the carrier
            frequency and bandwidth indicated by carrierFreq and
            allowedMeasBandwidth within the corresponding entry;
            4>perform measurements in the carrier frequency and bandwidth indicated
            by carrierFreq and allowedMeasBandwidth within the corresponding entry;
            NOTE: The fields s-NonIntraSearch in SystemInformationBlockType3 do not
            affect the UE measurement procedures in IDLE mode. How the UE performs
            measurements in IDLE mode is up to UE implementation as long as the
            requirements in TS 36.133 [16] are met for measurement reporting. UE is
            not required to perform idle measurements if SIB2 idle measurement
            indication is not configured.
            4>if the measCellList is included:
               5>   consider PCell and cells identified by each entry within the
                 measCellList to be applicable for idle mode measurement reporting;
            4>else:
               5>   consider PCell and up to maxCellMeasIdle strongest identified cells
                 whose RSRP/RSRQ measurement results are above the value(s)
                 provided in qualityThreshold (if any) to be applicable for idle mode
                 measurement reporting;
            4>store measurement results for cells applicable for idle mode measurement
            reporting within the VarMeasIdleReport;
         3>    else:
            4>do not consider the carrier frequency to be applicable for idle mode
            measurement reporting;
   1> if validityArea is configured in VarMeasIdleConfig and UE reselects to a serving
      cell whose physical cell identity does not match any entry in validityArea for the
      corresponding carrier frequency:
      2>    stop T331;
5.6.20.3     T331 expiry or stop
The UE shall:
   1> if T331 expires or is stopped:
      2>    release the VarMeasIdleConfig;

NOTE:
It is up to UE implementation whether to continue IDLE mode measurements according to SIB5 configuration after T331 has expired or stopped.

---

Validity Area: Another concept introduced in the LTE Release 15 solution is a validity area, which comprises a list of Physical Cell Identities (PCIs). The intention is to limit the area where CA or DC may be setup later when the UE resumes/setups the connection, so the early measurements are somewhat useful for that purpose. If validityArea is configured, and the UE reselects to a serving cell whose PCI does not match any entry in validityArea for the corresponding carrier frequency, the timer T331 is stopped. Then, the UE stops to perform IDLE measurements and releases the configuration (i.e., VarMeasIdleConfig). Notice that this does not necessarily imply that the UE releases the idle measurements that were configured in Release and that were performed, i.e. these may still be stored and possibly Notice that it is not mandatory for the source node releasing/suspending the UE to provide a dedicated idle measurement configuration for the purpose of early measurements. If the UE is released/suspended to idle without being provided with a list of carriers to be measured, the UE obtains that from SIB2, as written in the excerpt from 3GPP TS 36.331 V15.3.0 below:

---

1> if the RRCConnectionRelease message includes the measIdleConfig:
     2>    clear VarMeasIdleConfig and VarMeasIdleReport;
     2>    store the received measIdleDuration in VarMeasIdleConfig;
     2>    start T331 with the value of measIdleDuration;
     2>    if the measIdleConfig contains measIdleCarrierListEUTRA:

```
    3>  store the received measIdleCarrierListEUTRA in
        VarMeasIdleConfig;
    2>  else:
        3>  store the measIdleCarrierListEUTRA received in SIB5 in
            VarMeasIdleConfig;
    2>  start performing idle mode measurements as specified in 5.6.20;
...
```

And, in the case of the list not being provided in RRCConnectionRelease, at every cell reselection the UE performs the SIB5 acquisition to possibly update its list of carriers to measure as shown in the excerpt from 3GPP TS 36.331 V15.3.0 below:

```
            5.2.2.12    Actions upon reception of
            SystemInformationBlockType5
            Upon receiving
            SystemInformationBlockType5, the UE
            shall:
            ...
                1>  if in RRC_IDLE and UE has stored
                    VarMeasIdleConfig_and SIB5 includes
                    the measIdleConfigSIB and the UE is
                    capable of IDLE mode measurements
                    for CA:
                    2>      if T331 is running and
                        VarMeasIdleConfig does not
                        contain measIdleCarrierListEUTRA
                        received from the
                        RRCConnectionRelease message:
                        3>      store the
                            measIdleCarrierListEUTRA of
                            measIdleConfigSIB within
                            VarMeasIdleConfig;
                    2>      perform idle mode
                        measurements on supported
                        carriers as specified in 5.6.20;
```

If the UE enters a cell within the validity area that is not broadcasting the measurement configuration in SIB5, the UE continues to perform idle measurements according to the SIB5 acquired in the source cell (i.e., the cell the UE was suspended or released).

RRC_INACTIVE in NR and Possible in LTE Release 15

As part of the standardized work on 5G NR in 3GPP, it has been decided that NR should support an RRC_INACTIVE state with similar properties as the suspended state in LTE Release 13. The RRC_INACTIVE has slightly different properties from the late state in that it is a separate RRC state and not part of RRC_IDLE as in LTE. Additionally, the Core Network (CN)/RAN connection (NG or N2 interface) is kept for RRC_INACTIVE while it was suspended in LTE. FIG. 6 is a figure showing a state machine and possible state transitions in NR.

The properties of the states above is as follows:
RRC_IDLE:
  A UE specific Discontinuous Reception (DRX) may be configured by upper layers;
  UE controlled mobility based on network configuration;
  The UE:
    Monitors a Paging channel for CN paging using 5G System Architecture Evolution Temporary Mobile Subscriber Identity (5G-S-TMSI);
    Performs neighboring cell measurements and cell (re-)selection;
    Acquires system information.
RRC_INACTIVE:
  A UE specific DRX may be configured by upper layers or by RRC layer;
  UE controlled mobility based on network configuration;
  The UE stores the AS context;
  The UE:
    Monitors a Paging channel for CN paging using 5G-S-TMSI and RAN paging using Inactive Radio Network Temporary Identifier (I-RNTI);
    Performs neighboring cell measurements and cell (re-)selection;
    Performs RAN-based notification area updates periodically and when moving outside the RAN-based notification area;
    Acquires system information.
RRC_CONNECTED:
  The UE stores the AS context.
  Transfer of unicast data to/from UE.
  At lower layers, the UE may be configured with a UE specific DRX;
  For UEs supporting CA, use of one or more SCells, aggregated with the Special Cell (SpCell), for increased bandwidth;
  For UEs supporting DC, use of one SCG, aggregated with the MCG, for increased bandwidth;
  Network controlled mobility, i.e. handover within NR and to/from E-UTRAN.
  The UE:
    Monitors a Paging channel;
    Monitors control channels associated with the shared data channel to determine if data is scheduled for it;
    Provides channel quality and feedback information;
    Performs neighboring cell measurements and measurement reporting;
    Acquires system information.

Introducing Early Measurements Upon Idle/Inactive to Connected Transition in NR (Release 16)

A work item has been approved in Release 16 to enhance the setup of CA/DC in NR. The Work Item Description (WID) "Enhancing CA Utilization" was approved in RAN #80 in RP-181469, and updated in RAN #81 in RP-182076 and, one of the objectives is the following:
  Early Measurement reporting: Early and fast reporting of measurements information availability from neighbor and serving cells to reduce delay setting up MR-DC and/or CA. [RAN2, RAN4]
    This objective applies to MR-DC, NR-NR DC and CA
    The objective should consider measurements in IDLE, INACTIVE mode and CONNECTED mode
    The impacts on UE power consumption should be minimized
    The LTE Rel-15 euCA work should be utilized, when applicable
  Hence, 3GPP is going to investigate solutions to enable early measurements performed when the UE is in RRC_INACTIVE or RRC_IDLE state and, reporting mechanisms for when the UE enters RRC_CONNECTED.
  Based on contributions submitted to RAN2 #105 to Athens, three different kinds of solutions are going to be considered:
    1. UE reports early measurements in UEInformationResponse after request from network in UEInformationRequest transmitted after the UE sends an RRCResumeComplete or, after security is activated when UE comes from idle without stored context (as in LTE Release 15);

2. UE reports early measurements with (e.g., multiplexed with or as part of the message) RRCResumeComplete; and
3. UE reports early measurements with (e.g., multiplexed with or as part of the message) RRCResumeRequest.

There are some differences in details of each of these solutions, and not all of them may be applicable for RRC_IDLE in the same way they are for RRC_INACTIVE. However, in any of these solutions for the reporting, the UE relies on a measurement configuration, which may be provided with dedicated signaling when the UE is suspended to RRC_INACTIVE or when the UE is released to RRC_IDLE. That measurement configuration indicates how the UE shall perform these measurements to be reported when the UE resumes (in the case of coming from RRC_INACTIVE or setups up a connection, in the case of coming from RRC_IDLE).

Then, as this has not yet been agreed for NR, one can consider that the existing solution for the handling of early measurement configuration for NR is like that in LTE, i.e.:

UE receives a measurement configuration (for early measurement reporting) containing a list of carrier frequencies in dedicated signaling (e.g., in RRCRelease message) when the UE is released to IDLE or suspended to INACTIVE;

UE receives a measurement configuration (for early measurement reporting) not containing a list of carrier frequencies in dedicated signaling (e.g., in RRCRelease message) when the UE is released to IDLE or suspended to INACTIVE. Then, UE obtains the list of carriers from a SIB (e.g., SIB2, SIB3, SIB4, SIB5, etc.). Upon cell reselection the UE checks if it needs to update its carrier frequency list for early measurements based on a SIB of the target cell.

Problems with Existing Solutions

There currently exist certain challenge(s) in regard to early measurements, particularly in NR.

SUMMARY

Systems and methods are disclosed herein for handling measurement configurations for a power saving state and/or handling associated measurements, upon receiving a message from a network node while performing measurements in accordance with the measurement configurations while in the power saving state. Embodiments of a method performed by a wireless device in a cellular communications system are disclosed. In some embodiments, a method performed by a wireless device in a cellular communications system comprises receiving at least one measurement configuration for a power saving state and performing measurements in the power saving state in accordance with the at least one measurement configuration. The method further comprises, while performing the measurements in the power saving state, receiving a message from a network node and performing one or more actions to handle the at least one measurement configuration, the measurements, or both the measurement configuration and the measurements, upon receiving the message. In this manner, the wireless device is able to handle measurement configurations for the power saving state and/or the associated measurements when the wireless device receives a message (e.g., a message that may or may not include measurement configurations) from the network while performing measurements in the power saving state in accordance with a previously received measurement configuration.

In some embodiments, the message received from the network node is a message that may or may not include a measurement configuration for measurements in the power saving state. In some other embodiments, the message received from the network node is a message that indicates to the wireless device that the wireless device is to remain in the power saving state or transition to another power saving state.

In some embodiments, the message received from the network node is a Radio Resource Control (RRC) Release like message. In some embodiments, the RRC Release like message is an RRCRelease message or an RRCConnectionRelease message.

In some embodiments, the method further comprises, while performing the measurements in the power saving state, sending an RRC Resume Request like message to the network node. Further, receiving the message from the network node comprises receiving an RRC Release like message from the network node. In some embodiments, the RRC Resume Request like message is an RRCResumeRequest or RRCResumeRequest1 or RRCConnectionResumeRequest, and the RRC Release like message is an RRCRelease message or an RRCConnectionRelease message.

In some embodiments, performing the one or more actions to handle the at least one measurement configuration, the measurements, or both the measurement configuration and the measurements comprises stop performing measurements in the power saving state in accordance with the at least one measurement configuration and performing a set of actions with respect to the at least one measurement configuration, the measurements, or both the at least one measurement configuration and the measurements. In some embodiments, the set of actions comprises releasing the at least one measurement configuration, releasing the measurements performed in accordance with the at least one measurement configuration, or both releasing the at least one measurement configuration and releasing the measurements performed in accordance with the at least one measurement configuration.

In some embodiments, performing the measurements in the power saving state in accordance with the at least one measurement configuration comprises starting a timer and performing the measurements in the power saving state in accordance with the at least one measurement configuration while the timer is running. Receiving the message from the network node comprises receiving the message from the network node while the timer is running. Performing the one or more actions to handle the at least one measurement configuration, the measurements, or both the measurement configuration and the measurements comprises stopping the timer such that performing measurements in the power saving state in accordance with the at least one measurement configuration is stopped and performing a set of actions with respect to the at least one measurement configuration, the measurements, or both the at least one measurement configuration and the measurements. In some embodiments, the set of actions comprises releasing the at least one measurement configuration, releasing the measurements performed in accordance with the at least one measurement configuration, or both releasing the at least one measurement configuration and releasing the measurements performed in accordance with the at least one measurement configuration.

In some embodiments, the RRC Release like message does not contain a measurement configuration for measurements in a power saving state, and performing the one or more actions to handle the at least one measurement configuration, the measurements, or both the measurement configuration and the measurements comprises keeping the at least one measurement configuration and the measurements performed in accordance with the at least one measurement configuration and continuing to perform measurements in accordance with the at least one measurement configuration. In some embodiments, continuing to perform measurements in accordance with the at least one measurement configuration comprises not stopping an associated timer.

In some embodiments, the RRC Release like message does contain a measurement configuration for measurements in a power saving state, and performing the one or more actions to handle the at least one measurement configuration, the measurements, or both the measurement configuration and the measurements comprises stop performing measurements in the power saving state in accordance with the at least one measurement configuration and performing a set of actions with respect to the at least one measurement configuration, the measurements, or both the at least one measurement configuration and the measurements. In some embodiments, stop performing measurements comprises stopping an associated timer such that performance of measurements in accordance with the at least one measurement configuration is stopped. In some embodiments, the set of actions comprises releasing the at least one measurement configuration, releasing the measurements performed in accordance with the at least one measurement configuration, or both releasing the at least one measurement configuration and releasing the measurements performed in accordance with the at least one measurement configuration.

In some embodiments, the method further comprises determining whether the RRC Release like message contains a measurement configuration for measurements in a power saving state, and performing the one or more actions to handle the at least one measurement configuration, the measurements, or both the measurement configuration and the measurements comprises, upon determining that the RRC Release like message does not contain a measurement configuration for measurements in a power saving state, keeping the at least one measurement configuration and the measurements performed in accordance with the at least one measurement configuration and continuing to perform measurements in accordance with the at least one measurement configuration. Performing the one or more actions to handle the at least one measurement configuration, the measurements, or both the measurement configuration and the measurements further comprises, upon determining that the RRC Release like message does contain a measurement configuration for measurements in a power saving state, stop performing measurements in the power saving state in accordance with the at least one measurement configuration and performing a set of actions with respect to the at least one measurement configuration, the measurements, or both the at least one measurement configuration and the measurements.

In some embodiments, the RRC Release like message does contain a measurement configuration for measurements in a power saving state, and performing the one or more actions to handle the at least one measurement configuration, the measurements, or both the measurement configuration and the measurements comprises at least one of the following actions: adding a new entry in the at least one measurement configuration based on the measurement configuration contained in the RRC Release like message, modifying the at least one measurement configuration based on the measurement configuration contained in the RRC Release like message, and removing an existing entry in the at least one measurement configuration based on the measurement configuration contained in the RRC Release like message.

In some embodiments, the method further comprises determining whether the RRC Release like message contains a measurement configuration for measurements in a power saving state, and performing the one or more actions to handle the at least one measurement configuration, the measurements, or both the measurement configuration and the measurements comprises, upon determining that the RRC Release like message does not contain a measurement configuration for measurements in a power saving state, keeping the at least one measurement configuration and the measurements performed in accordance with the at least one measurement configuration and continuing to perform measurements in accordance with the at least one measurement configuration. Performing the one or more actions to handle the at least one measurement configuration, the measurements, or both the measurement configuration and the measurements further comprises, upon determining that the RRC Release like message does contain a measurement configuration for measurements in a power saving state, at least one of the following: adding a new entry in the at least one measurement configuration based on the measurement configuration contained in the RRC Release like message, modifying the at least one measurement configuration based on the measurement configuration contained in the RRC Release like message, and removing an existing entry in the at least one measurement configuration based on the measurement configuration contained in the RRC Release like message.

In some embodiments, the RRC Release like message comprises an indication that the wireless device is to remain in the power saving state, and performing the one or more actions to handle the at least one measurement configuration, the measurements, or both the measurement configuration and the measurements comprises performing one or more actions in accordance with any one of the embodiments above. In some embodiments, the indication that the wireless device is to remain in the power saving state is a suspendConfig comprised in the RRC Release like message.

In some embodiments, the RRC Release like message does not comprise an indication that the wireless device is to remain in the power saving state, and performing the one or more actions to handle the at least one measurement configuration, the measurements, or both the measurement configuration and the measurements comprises stop performing measurements in the power saving state in accordance with the at least one measurement configuration and performing a set of actions. In some embodiments, the set of actions comprises releasing the at least one measurement configuration, releasing the measurements performed in accordance with the at least one measurement configuration, or both releasing the at least one measurement configuration and releasing the measurements performed in accordance with the at least one measurement configuration.

In some embodiments, the method further comprises determining whether the RRC Release like message contains an indication that the wireless device is to remain in the power saving state, and performing the one or more actions to handle the at least one measurement configuration, the measurements, or both the measurement configuration and the measurements comprises, upon determining that the RRC Release like message does contain an indication that the wireless device is to remain in the power saving state, performing one or more actions in accordance with any one of the embodiments described above. Performing the one or more actions to handle the at least one measurement configuration, the measurements, or both the measurement configuration and the measurements further comprises, upon determining that the RRC Release like message does not contain an indication that the wireless device is to remain in the power saving state, stop performing measurements in the power saving state in accordance with the at least one measurement configuration and performing a set of actions, the set of actions comprising releasing the at least one measurement configuration, releasing the measurements performed in accordance with the at least one measurement configuration, or both releasing the at least one measurement configuration and releasing the measurements performed in accordance with the at least one measurement configuration.

In some embodiments, the method further comprises, while performing the measurements in the power saving state, sending an RRC Resume Request like message to the network node. Receiving the message from the network node comprises receiving an RRC Resume like message from the network node. In some embodiments, performing the one or more actions to handle the at least one measurement configuration, the measurements, or both the measurement configuration and the measurements comprises stop performing measurements in the power saving state in accordance with the at least one measurement configuration and storing the at least one measurement configuration for the power saving state. In some embodiments, the method further comprises, while in a connected state, receiving an RRC Release like message and restoring the stored at least one measurement configuration for the power saving state.

Corresponding embodiments of a wireless device are also disclosed. In some embodiments, a wireless device for a cellular communications system is adapted to receive at least one measurement configuration for a power saving state and perform measurements in the power saving state in accordance with the at least one measurement configuration. The wireless device is further adapted to, while performing the measurements in the power saving state, receive a message from a network node and perform one or more actions to handle the at least one measurement configuration, the measurements, or both the measurement configuration and the measurements, upon receiving the message.

In some embodiments, the wireless device comprises one or more transmitters, one or more receivers, and processing circuitry associated with the one or more transmitters and the one or more receivers. The processing circuitry is configured to cause the wireless device to receive the at least one measurement configuration for the power saving state, perform the measurements in the power saving state in accordance with the at least one measurement configuration, and, while performing the measurements in the power saving state, receive the message from the network node and perform the one or more actions to handle the at least one measurement configuration, the measurements, or both the measurement configuration and the measurements, upon receiving the message.

Embodiments of a method performed by a network node are also disclosed. In some embodiments, a method performed by a network node comprises providing, to a wireless device, an RRC Release like message comprising at least one measurement configuration for a power saving state, storing the at least one measurement configuration, receiving a request from another network node, and sending information comprising the at least one measurement configuration to the other network node in response to the request.

In some embodiments, storing the at least one measurement configuration comprises storing the at least one measurement configuration in an inactive access stratum context of the wireless device. In some embodiments, sending the information to the other network node comprises sending the inactive access stratum context of the wireless device to the other network node. In some embodiments, the wireless device is attempting to resume a connection with the other network node.

Corresponding embodiments of a network node are also disclosed. In some embodiments, a network node for a cellular communications system is adapted to provide, to a wireless device, an RRC Release like message comprising at least one measurement configuration for a power saving state, store the at least one measurement configuration, receive a request from another network node, and send information comprising the at least one measurement configuration to the other network node in response to the request.

In some embodiments, the network node comprises processing circuitry configured to cause the network node to provide the RRC Release like message comprising the at least one measurement configuration for the power saving state to the wireless device, store the at least one measurement configuration, receive the request from another network node, and send the information comprising the at least one measurement configuration to the other network node in response to the request.

In some other embodiments, a method performed by a network node comprises receiving a resume request like message from a wireless device in a power saving state, retrieving information regarding the wireless device from another network node, and determining that a measurement configuration of the wireless device for measurements in the power saving state is present in the information. The method further comprises, upon determining that the measurement configuration of the wireless device for measurements in the power saving state is present in the information, determining at least one of: that the measurement configuration of the wireless device is to be modified, that the measurement configuration of the wireless device is to be released, or that a new measurement configuration for the wireless device for measurements in the power saving state is to be added. The method further comprises sending a message to the wireless device in accordance with a result of the determining.

In some embodiments, the method further comprises, upon determining that the measurement configuration of the wireless device is to be modified, modifying the measurement configuration of the wireless device. The message sent to the wireless device comprises the modified measurement configuration of the wireless device.

In some embodiments, the method further comprises, upon determining that the measurement configuration of the wireless device is to be released, releasing the measurement configuration of the wireless device. The message sent to the wireless device does not comprise the measurement configuration of the wireless device.

In some embodiments, the method further comprises, upon determining that a new measurement configuration is to be added to the measurement configuration of the wireless device, adding the new measurement configuration to the measurement configuration of the wireless device, thereby providing an updated measurement configuration of the wireless device for measurements in the power saving state. The message sent to the wireless device comprises the updated measurement configuration of the wireless device.

In some embodiments, the message sent to the wireless device is an RRC Release like message.

Corresponding embodiments of a network node are also disclosed. In some embodiments, a network node for a cellular communications system is adapted to receive a resume request like message from a wireless device in a power saving state, retrieve information regarding the wireless device from another network node, and determine that a measurement configuration of the wireless device for measurements in the power saving state is present in the information. The network node is further adapted to, upon determining that the measurement configuration of the wireless device for measurements in the power saving state is present in the information, determine at least one of: that the measurement configuration of the wireless device is to be modified, that the measurement configuration of the wireless device is to be released, or that a new measurement configuration for the wireless device for measurements in the power saving state is to be added. The network node is further adapted to send a message to the wireless device in accordance with a result of the determining.

In some embodiments, the network node comprises processing circuitry configured to cause the network node to receive the resume request like message from the wireless device in a power saving state, retrieve the information regarding the wireless device from the another network node, determine that the measurement configuration of the wireless device for measurements in the power saving state is present in the information, and, upon determining that the measurement configuration of the wireless device for measurements in the power saving state is present in the information, determine the at least one of: that the measurement configuration of the wireless device is to be modified, that the measurement configuration of the wireless device is to be released, or that the new measurement configuration for the wireless device for measurements in the power saving state is to be added. The processing circuitry is further configured to cause the network node to send the message to the wireless device in accordance with the result of the determining.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 20 through 23 are flowcharts illustrating methods implemented in a communication system, such as that of FIG. 18, in accordance with some embodiments of the present disclosure.

DETAILED DESCRIPTION

Figure 1:
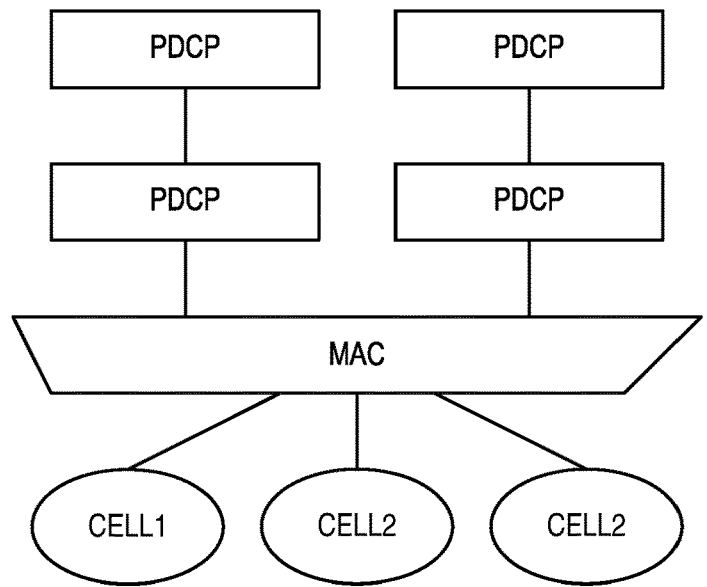
FIG. 1 illustrates Carrier Aggregation (CA) from the perspective of the Medium Access Control (MAC) layer.
Figure 2:
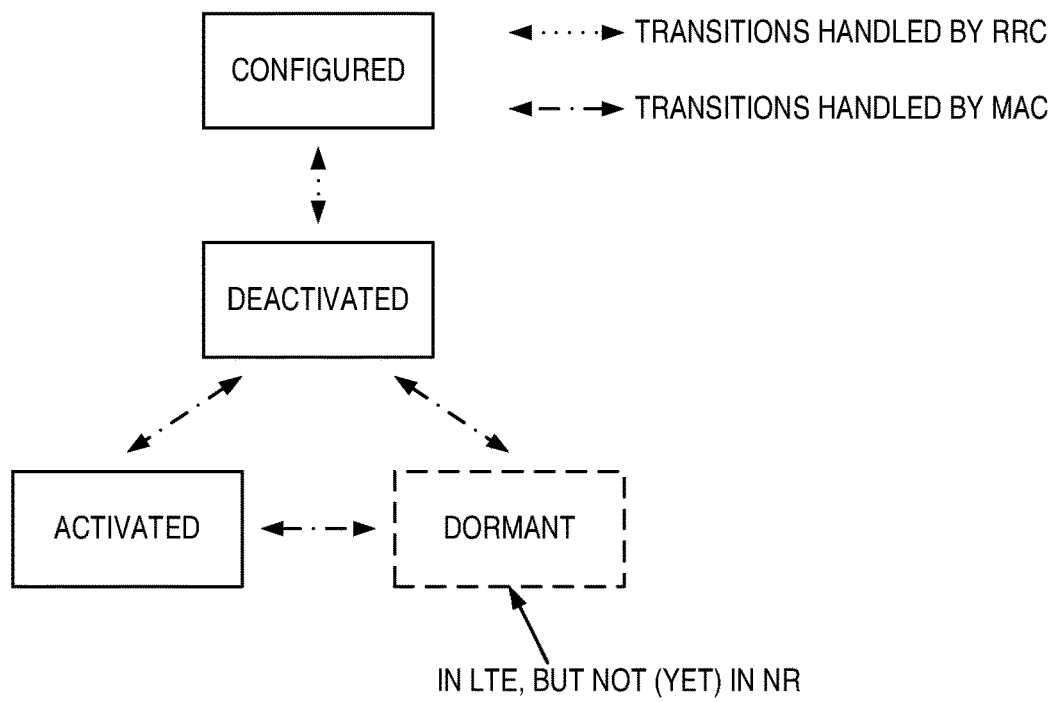
FIG. 2 illustrates transitions between different User Equipment (UE) states.
Figure 3:
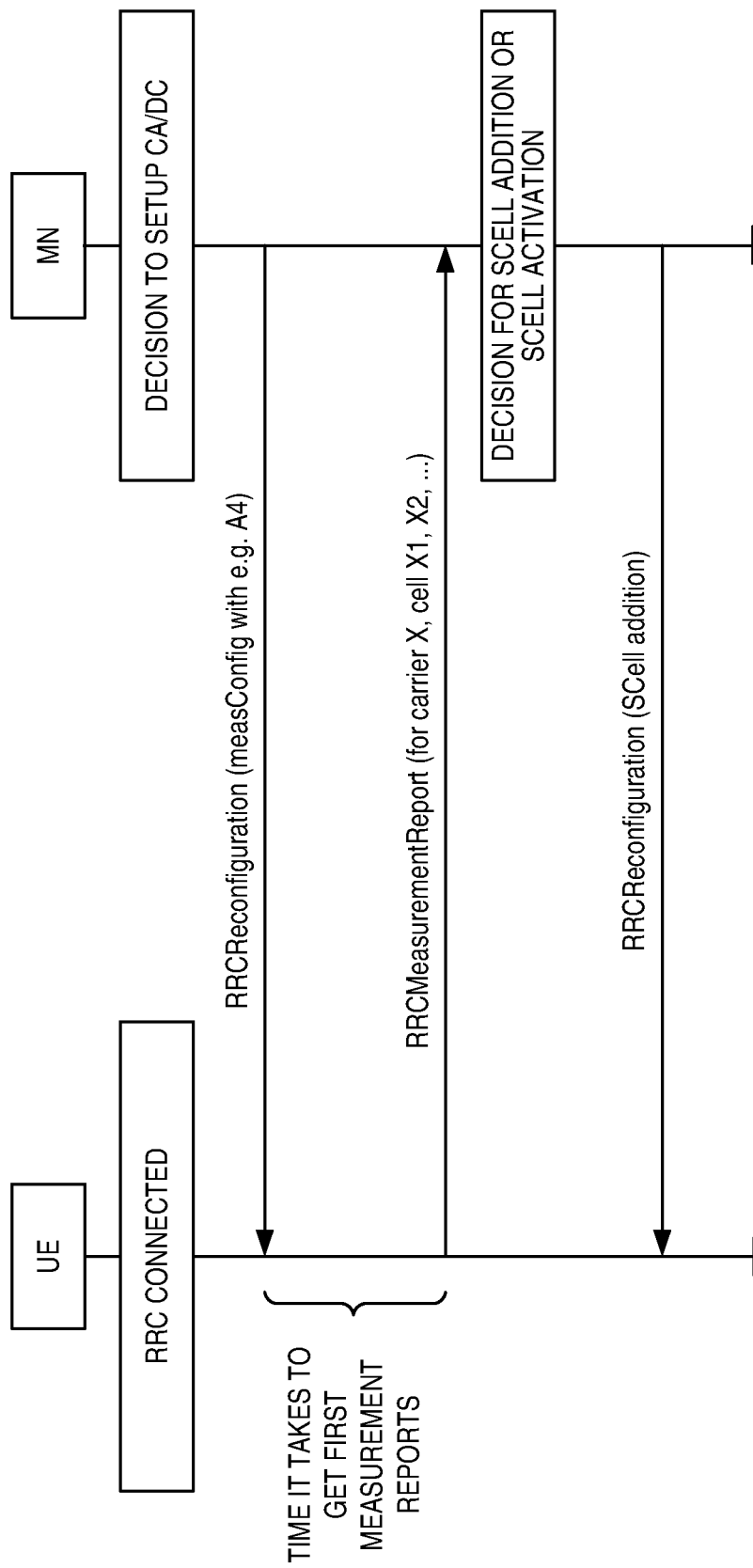
FIG. 3 illustrates a process in which the network decides to setup CA or Dual-Connectivity (DC) for a UE.
Figure 4:
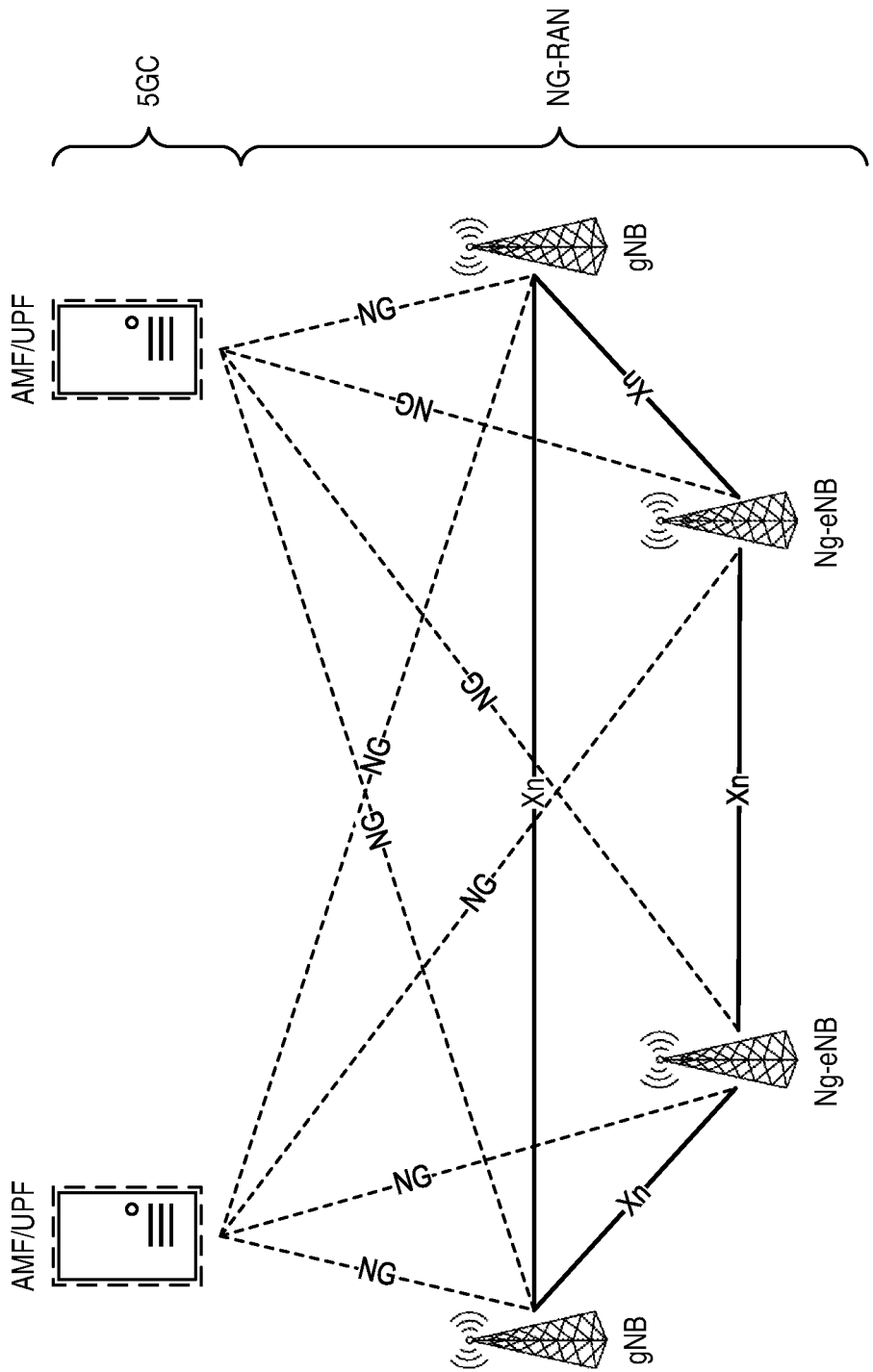
FIG. 4 illustrates the Fifth Generation (5G) System (5GS) architecture.
Figure 5:
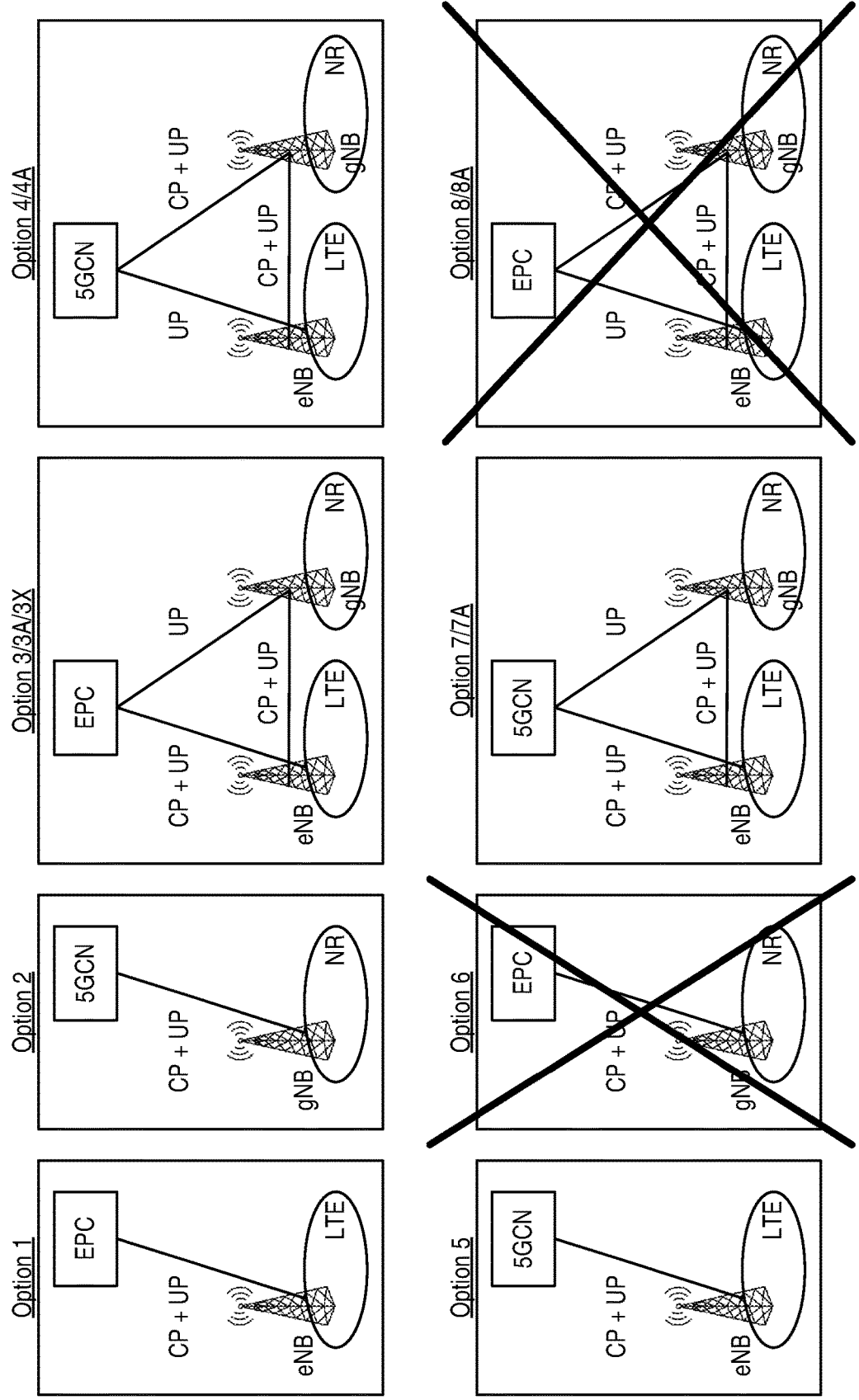
FIG. 5 illustrates different ways to deploy a 5G network with or without interworking with Long Term Evolution (LTE)
Figure 6:
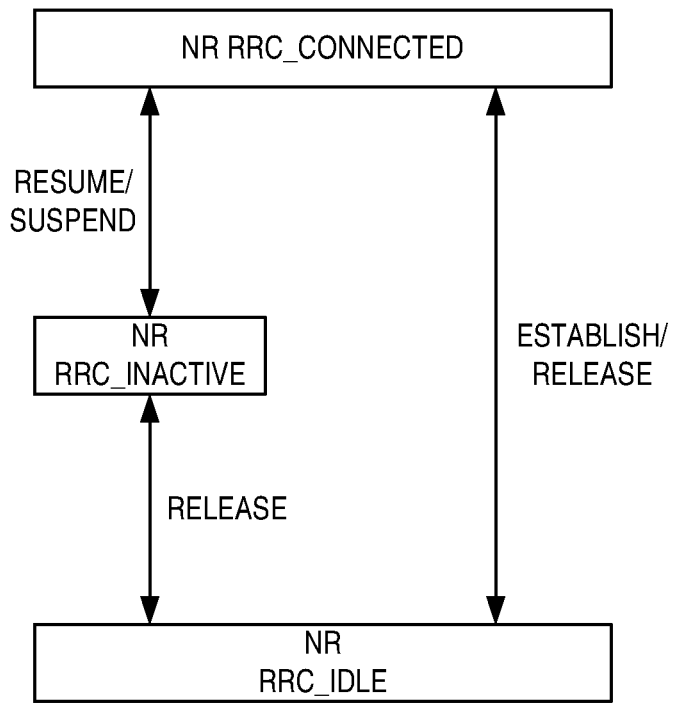
FIG. 6 illustrates a state machine and possible state transitions in New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In LTE, the idle measurements feature (sometimes called early measurements) consists of the UE receiving a measurement configuration when it transitions from RRC_CONNECTED to RRC_IDLE (RRC_IDLE with a stored context or RRC_IDLE without a stored context). The UE then starts a validity timer and, while the validity timer is running, the UE performs the so-called idle measurements according to the provided configuration. The dedicated signaling in RRCConnectionRelease may contain a list of carrier frequencies to be measured. If that is not present in the measurement configuration, the UE obtains the list of carrier frequencies in System Information Block 5 (SIB5) of the source cell from which the UE is being released. The list of carrier frequencies may be updated at every cell reselection upon acquiring SIB5 in the target cell to which the UE reselects.

Upon receiving the measurement configuration when going to RRC_IDLE, the UE starts the validity timer (i.e., T331) with a value received as part of the configuration. The UE performs idle measurements while the timer (T331) is running. According to the LTE Radio Resource Control (RRC) specification (i.e., 3GPP Technical Specification (TS) 36.331), the UE is not required to perform these measurements if the timer (T331) is not running, which occurs in the following cases:

the timer (T331) stops if the UE reselects to a cell not within the configured validity area;

the timer (T331) stops when it expires;

the timer (T331) stops when the UE receives an RRC-ConnectionResume or an RRCConnectionSetup message i.e. UE enters RRC_CONNECTED.

This is summarized in the RRC specifications of LTE in the following table from 3GPP TS 36.331 V15.30:

| Timer | Start | Stop | At expiry |
|---|---|---|---|
| T331 | Upon receiving RRCConnectionRelease message including measIdleConfig. | Upon receiving RRCConnectionSetup, RRCConnectionResume or, if validityArea is configured, upon reselecting to cell that does not belong to validityArea. | Release the stored VarMeasIdleConfig. |

When the timer expires or is stopped (i.e., in the cases above), the UE releases the measurement configuration used for the idle measurements, i.e. it releases the UE variable where the configuration is stored (VarMeasIdleConfig), as shown in the excerpt from 3GPP TS 36.331 V15.3.0 below:

> 5.6.20.3 T331 expiry or stop
> The UE shall:
> 1> if T331 expires or is stopped:
> 2> release the VarMeasIdleConfig;

NOTE:
It is up to UE implementation whether to continue IDLE mode measurements according to SIB5 configuration after T331 has expired or stopped.

The existing solution for LTE says that the UE stops performing idle measurements (i.e., to support early measurements reporting) upon cell reselection to a cell not in the UE's configured validity area or upon the reception of RRCConnectionSetup or the reception of RRCConnectionResume. This is defined by stopping the timer controlling early measurements (i.e., T331 in LTE) in these scenarios.

In NR, a first new scenario is when an RRC_INACTIVE UE transmits an RRCResumeRequest or RRCResumeRequest1 message and receives an RRCRelease message with suspend configuration in response. The reception of the RRCRelease message with suspend configuration indicates that the UE is to remain in RRC_INACTIVE, which is equivalent to doing a very quick transient transition to RRC_CONNECTED and then to RRC_INACTIVE again. This is shown in FIG. 7, which illustrates an RRC connection resume followed by a successful network suspend.

In NR, a second new scenario is when an RRC_INACTIVE UE transmits an RRCResumeRequest and receives an RRCRelease without a suspend configuration in response. The reception of the RRCRelease without a suspend configuration indicates that the UE is to transition to RRC_IDLE, which is equivalent to doing a very quick transient transition to RRC_CONNECTED and then to RRC_IDLE. This is shown in FIG. 8, which illustrates an RRC connection resume followed by a successful network release.

Figure 7:
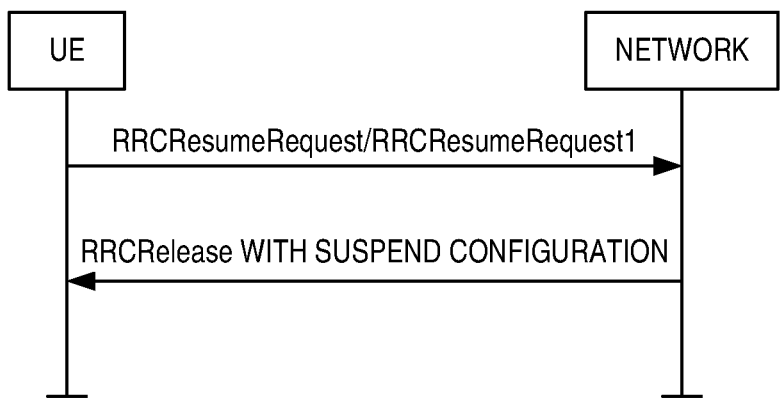
FIG. 7 illustrates a scenario in NR in which a Radio Resource Control (RRC) connection resume is followed by a successful network suspend.
Figure 8:
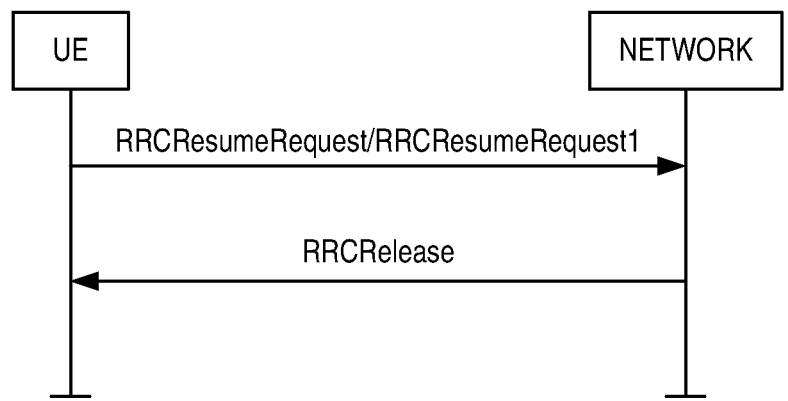
FIG. 8 illustrates a scenario in NR in which a RRC connection resume is followed by a successful network release.

There are different cases where the network may respond a Resume Request like message (RRCResumeRequest or RRCResumeRequest1 as shown in the flows of FIGS. 7 and 8) with an RRCRelease message, such as when the resume procedure is triggered due to a mobility-based RAN area Update or periodic RAN area Update or when the network wants to redirect the UE to another frequency (in the same Radio Access Technology (RAT) or different RAT).

If the existing solution in LTE is adopted in NR, the UE may be performing early measurements (e.g., according to a configuration provided in RRCRelease or obtained in a SIB) when it tries to resume (i.e., when it sends an RRC Resume Request like message) and receives in response a new RRCRelease message that may or may not contain a new measurement configuration for early measurements. In this scenario, it remains unclear as to what the UE is to do with the stored configuration for early measurements, the timer controlling the measurements, and the measurement results, and whether the UE is to continue to perform measurements or not.

Certain aspects of the present disclosure and their embodiments may provide solutions to the aforementioned or other challenges. Embodiments of a method executed by a UE for handling at least one measurement configuration (e.g., provided for idle/inactive measurements, for early measurement reporting when transition to CONNECTED) are disclosed. In some embodiments, the method executed by the UE comprises one or more of the following aspects:

The UE receives, while in CONNECTED state or while in a power saving state when attempting to enter CONNECTED state, an RRC Release like message to transition to a power saving state (e.g., INACTIVE, IDLE, IDLE with stored context, IDLE without stored context, etc.), stores an idle/inactive measurement configuration (e.g., for early measurement reporting) that may be contained in the message, and starts a timer possibly with a received value (e.g., timer T331). The message may contain a validity area for the idle/inactive measurements.

The UE performs measurements according to the received measurement configuration upon entering the power saving state (e.g., INACTIVE or IDLE), while the timer (e.g., T331) is running.

While the timer (e.g., T331) controlling measurements in power saving state (e.g., INACTIVE, IDLE, etc.) is running and the UE is trying to resume an RRC connection (e.g., transmitting an RRC Resume Request like message), the UE receives, in response to trying to resume the RRC connection, an RRC Release like message and performs a set of actions to handle the measurement configurations for power saving state (e.g., for early measurement reporting) and measurements associated to the stored measurement configuration(s).

In a first solution, the UE stops the timer (e.g., T331) and performs a set of cleaning actions such as clearing/releasing the measurement configuration and measurement results.

In a second solution,
- If the UE receives an RRC release like message in response to an RRC Resume like message while the timer T331 (or equivalent) is running and the message does not contain a measurement configuration for measurements in IDLE/INACTIVE (e.g., for early measurement reporting), the UE does not stop the timer (e.g., T331) and does not perform a set of cleaning actions (i.e., it does not clear the UE Inactive AS Context (containing the measurement configuration and measurement results). Hence, in some embodiments, the absence of a measurement configuration field (e.g., measIdleInactiveConfig-r16) in the RRC Release like message indicates that the UE shall continue performing measurements that have been previously configured according to a stored measurement configuration. That case may be applied in case the UE tried to resume and was released/suspended by the network, possibly without using context fetching (e.g., in an Radio Network Subsystem Application Part (RNSAP) User Adaptation (RNA) update without context fetching where the last serving node suspends/Releases the UE).
- Else, if the UE receives an RRC release like message in response to an RRC Resume like message while timer T331 (or equivalent) is running and the message contains a measurement configuration for measurements in IDLE/INACTIVE, e.g. for early measurement reporting, the UE performs a set of cleaning actions (i.e., clears the UE variables containing the measurement configuration and measurement results).

In a third solution:
- If the UE receives an RRC release like message in response to an RRC Resume like message while timer T331 (or equivalent) is running and the message does not contain a measurement configuration for measurements in IDLE/INACTIVE e.g. for early measurement reporting, the UE does not stop the timer (e.g. T331) and does not perform a set of cleaning actions (i.e. it does not clear the UE Inactive Access Stratum (AS) Context (containing the measurement configuration and measurement results). Hence, the absence of the measurement configuration field (e.g. measIdleInactiveConfig-r16) in the RRC Release like message indicates that the UE shall continue performing measurements that have been previously configured. That case may be applied in case the UE tried to resume and was released/suspended by the network, possibly without using context fetching (e.g. in an RNA update without context fetching where the last serving node suspends/Releases the UE).
- Else, if the UE receives an RRC release like message (in response to an RRC Resume like message) while timer T331 (or equivalent) is running and the message contains a measurement configuration for measurements in IDLE/INACTIVE e.g. for early measurement reporting, the UE may perform at least one of the following actions:
  - The UE adds a new entry in its stored measurement configuration i.e. the UE adds a new carrier frequency to its list of stored measurement configurations.
    - In one variant, upon addition, the UE re-starts the timer T331 (or equivalent) with a stored value in the UE variable containing the configuration.
    - In one variant, upon addition, the UE does not re-start the timer T331 (or equivalent).
  - The UE modifies a stored configuration in its stored measurement configuration i.e. the UE changes any field defined per carrier frequency in its list of stored measurement configurations.
    - In one variant, upon modification, the UE re-starts the timer T331 (or equivalent) with a stored value in the UE variable containing the configuration.
    - In one variant, upon modification, the UE does not re-start the timer T331 (or equivalent).
  - The UE removes an existing entry in its list of stored measurement configurations and, stops performing measurement according to the removed configuration.

In a fourth solution:
- If the UE receives an RRC release like message in response to an RRC Resume like message while timer T331 (or equivalent) is running and the message contains a suspendConfig, i.e., an indication that the UE remains in INACTIVE state, any of the solutions described above could apply (e.g. first, second or third solutions).
- Else, if the message does not contain a suspendConfig, an indication that the UE shall transition to IDLE state, the UE stops the timer T331 and performs the set of clean up actions such as delete the measurements, delete the configurations, and clear the UE variables.

Fifth solution: While the timer (e.g. T331) controlling measurements in power saving state (e.g. INACTIVE, IDLE, etc.) is running and the UE is trying to resume an RRC connection (i.e. transmitting an RRC Resume Request like message), the UE receives, in response to trying to resume the RRC connection, an RRC Resume like message and enters CONNECTED state. Upon that, the UE stops the timer T331 (or equivalent), stops performing the measurements, and stores the measurement configurations for power saving state (e.g. for early measurement reporting) while in CONNECTED state.

In some embodiments, the inactive/idle measurement configurations may be stored in a UE variable while the UE is in CONNECTED state.

In some embodiments, when the UE in CONNECTED receives an RRC Release message, the UE restores the idle/inactive measurement configuration. Further, in some embodiments, if the RRC Release message does not contain an idle/inactive measurement configuration, the UE resumes the restored configuration; otherwise, if the RRC Release message contains an idle/inactive measurement configuration, delta signaling applies.

That could be useful in case the UE triggers a Non-Access Stratum (NAS) signaling procedure in INACTIVE state e.g. a Tracking Area Update that requires the UE to enter CONNECTED for a short time. Then, with this solution, the network would not need to re-configure the idle/inactive measurements.

For any of the abovementioned topics, there may be different associated network embodiments. Below, a subset of these network embodiments is described.

Embodiments of a method executed by a source network node are also disclosed. In some embodiments, the method comprises one or more of the following:

The source network node transmits, to a UE in CONNECTED state, an RRC Release message with a suspend configuration indicating that the UE shall transition to INACTIVE state or without a suspend configuration indicating that the UE shall transition to IDLE, where the message comprises a measurement configuration for idle/inactive measurements e.g. for early measurement reporting, a timer value (e.g. T331), and a validity area.

The source network node stores the provided idle/inactive measurement configuration in the UE Inactive AS Context.

The source network node receives a request from a target network node to retrieve the UE Inactive AS Context.

The source network node retrieves the context and, if the UE is verified, provides the context to the target node.

Embodiments of a method executed by a target network node are also disclosed. In some embodiments, the method comprises one or more of the following:

The target network node receives a Resume Request message from an inactive UE.

The target network node retrieves the UE Inactive AS Context or, identifies that the context is stored in another node.

The target network node determines whether the idle/inactive measurement configuration is present. If present, the target network node determines whether they should be added, modified, or released (according to any of the solutions described above for handling the measurement configurations) in an RRC Release message to the UE.

In some embodiments, while the timer (e.g. T331) controlling measurements in power saving state (e.g. INACTIVE, IDLE, etc.) is running, the UE tries to resume an RRC connection (i.e. transmitting an RRC Resume Request like message) and receives, in response, an RRC Release like message. In some embodiments, the UE performs a set of actions to handle the measurement configurations for power saving state (e.g. for early measurement reporting) and measurements associated to the configuration(s).

Certain embodiments may provide one or more of the following technical advantage(s). By using embodiments of the present disclosure, the UE is capable of handling inactive/idle measurement configurations and stored measurements when the network responds an RRC Resume Request like message with an RRC Release like message, which may contain another inactive/idle measurement configuration. Further, embodiments of the method executed by the UE include different solutions that have different advantages, which are described below.

Advantages of the first solution: Compared to the existing solution (i.e. LTE Rel-15 solution on idle measurements for early reporting), this solution is consistent and simple. It allows the possibility to receive an RRC Release in response to an RRC Resume, stop the measurements configured by the last serving node (e.g. where the UE was suspended or released), and remove the stored measurements. It also allows the network to configure the UE again with new measurement configuration for a similar purpose, if the network wants to do so. Another potential advantage of this solution is that the UE and network would not necessarily have to store the idle/inactive measurement configuration in the UE Inactive AS context; hence, there is no risk of state mismatch between the UE and the network.

Advantages of the second solution: Compared to the first solution, this solution allows the network to let the UE continue to perform idle/inactive measurements according to the configuration that the UE has been configured by the source node when it was suspended last time (e.g. from CONNECTED) and possibly not bother to change that configuration (e.g. add or remove measurement configurations). At the same time, if network wants to do so, it still allows in the RRC Release to provide a new configuration. Upon that case, the UE deletes whatever it has stored and replaces it with new configurations and starts new measurements in the power saving state.

Advantages of the third solution: Compared to previous solutions, this solution allows the network substantial flexibility to add, remove, or modify measurement configurations without necessarily discontinuing measurements at the UE.

Advantages of the fourth solution: Compared to previous solutions, the UE only concerns itself with the handling of the idle/inactive measurement configuration when it transitions to inactive, and not idle.

Advantages of the fifth solution: Compared to the existing solution, whenever a UE is configured to perform idle mode measurements in a power saving mode (INACTIVE, IDLE, etc.), the UE would store these configurations, allowing the network to release the UE back to a power saving mode without a need to signal the idle mode measurement configurations.

Embodiments of the present disclosure described herein refer to a measurement configuration provided in an RRC Release like message to be used when the UE is in a power saving state. That state may be at least an RRC state such as IDLE (without a stored context), IDLE (with a stored context), INACTIVE, etc. The power saving state may also be called sleeping or dormant state, as most of the actions require less power consumption than when the UE is in CONNECTED state.

The examples described herein explain the configuration of early measurements done by NG-RAN i.e. the UE is in CONNECTED state in NR and tries to resume in NR and, in response, receives an RRC Release like message. This should be an example, as the method is also applicable at least in any of the cases below:

UE CONNECTED in NR is suspended to INACTIVE in NR and tries to resume in NR, receiving an RRC Release like message;

UE CONNECTED in NR is suspended to IDLE in NR and tries to resume in NR, receiving an RRC Release like message;

UE CONNECTED in LTE (or eLTE, i.e., LTE connected to 5G Core (5GC)) is suspended to INACTIVE in LTE and tries to resume in LTE, receiving an RRC Release like message;

UE CONNECTED in LTE is suspended to IDLE in LTE and tries to resume in LTE, receiving an RRC Release like message;

UE CONNECTED in NR is suspended to INACTIVE in NR and tries to resume in LTE, receiving an RRC Release like message; and UE CONNECTED in LTE is suspended to INACTIVE in LTE and tries to resume in NR, receiving an RRC Release like message.

Figure 9:
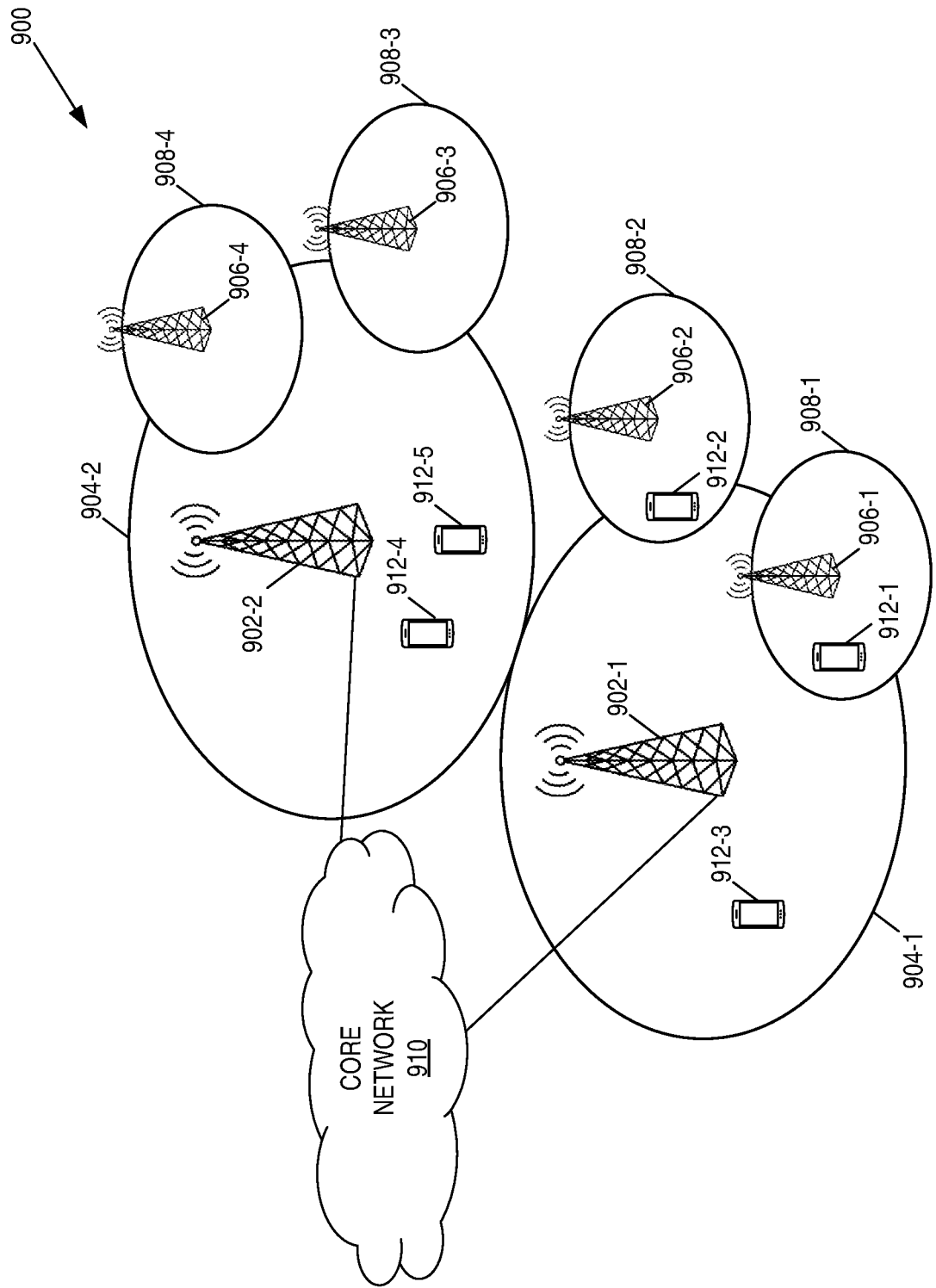
FIG. 9 illustrates one example of a cellular communications network in which embodiments of the present disclosure may be implemented.

FIG. 9 illustrates one example of a cellular communications network 900 in which embodiments of the present disclosure may be implemented. In the embodiments described herein, the cellular communications network 900 is an LTE or 5G NR network. In this example, the cellular communications network 900 includes base stations 902-1 and 902-2, which in LTE are referred to as eNBs and in 5G NR are referred to as gNBs, controlling corresponding macro cells 904-1 and 904-2. The base stations 902-1 and 902-2 are generally referred to herein collectively as base stations 902 and individually as base station 902. Likewise, the macro cells 904-1 and 904-2 are generally referred to herein collectively as macro cells 904 and individually as macro cell 904. The cellular communications network 900 may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The base stations 902 (and optionally the low power nodes 906) are connected to a core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

1 UE Methods

Figure 10:
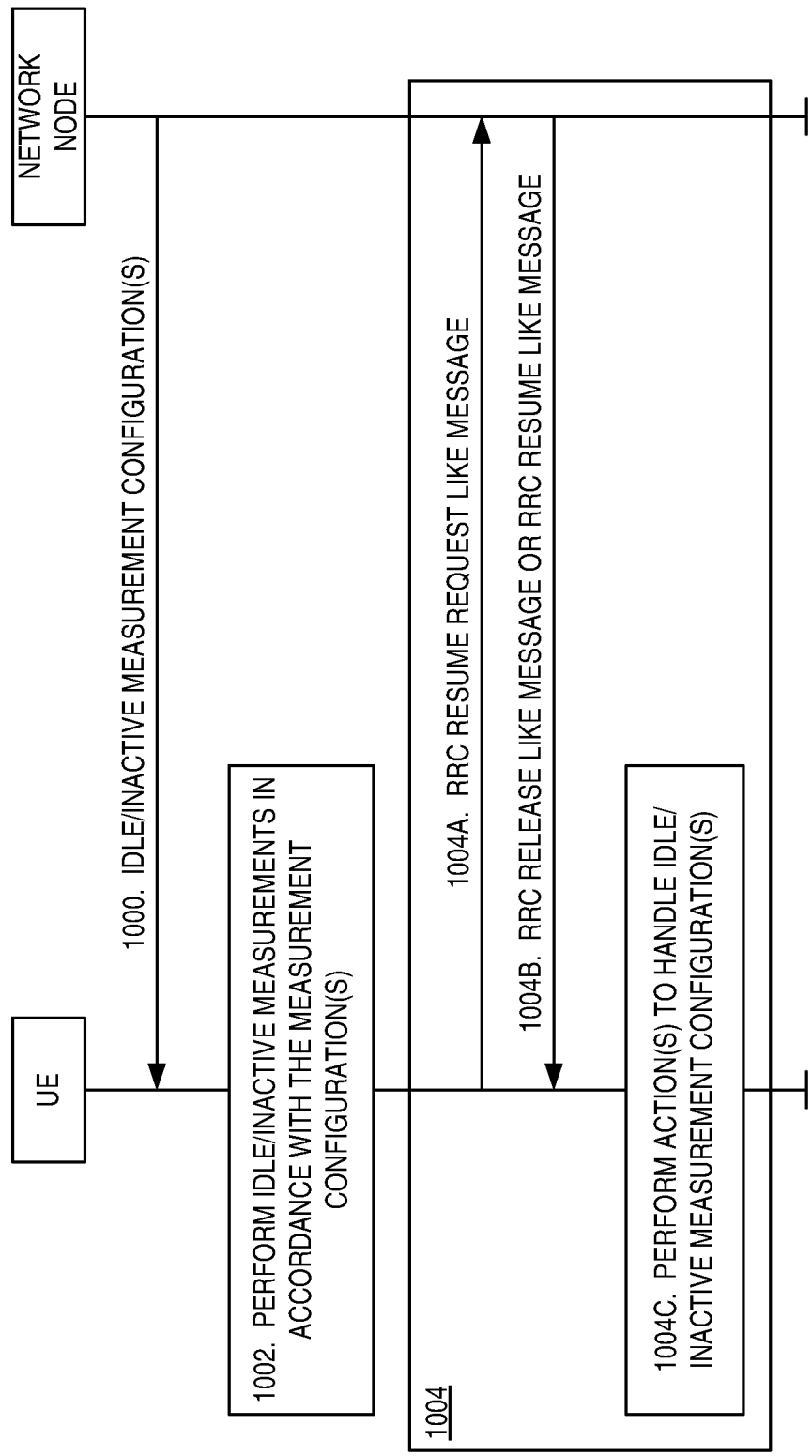
FIG. 10 illustrates the operation of a UE in accordance with some embodiments of the present disclosure.

Embodiments of a method performed by (i.e., executed by) a UE for handling at least one measurement configuration (e.g. provided for early measurement reporting when transition to CONNECTED) are disclosed herein. In general, as illustrated in FIG. 10, the method comprises the following steps.

Step 1000: The UE receives Idle/Inactive Measurement Configuration(s).

Step 1002: The UE performs Idle/Inactive Measurements.

Step 1004: The UE performs a 2-step Resume/Release while performing the Idle/Inactive Measurements. Here, the UE handles the Idle/Inactive measurement configuration(s) when performing the 2-step resume/release, in accordance with any one of a number of solutions described herein. More specifically, the UE attempts an RRC resume by sending an RRC Resume Request like message (e.g., RRC Resume Request) (step 1004A). In response, the UE receives an RRC Release like message (e.g., an RRCRelease) or an RRC Resume like message (RRCResume) (step 1004B). The UE performs one or more actions to handle the Idle/Inactive measurement configuration(s), e.g., in accordance with any one of the first, second, third, fourth, or fifth solutions described below (step 1004C).

First Solution: Upon transmitting a RRC Resume Request like message and, in response, receiving an RRC Release like message (e.g., while a timer for Idle/Inactive measurements is running), the UE releases the measurement configuration(s) and the measurement result(s).

Second Solution: Upon transmitting a RRC Resume Request like message and, in response, receiving an RRC Release like message (e.g., while a timer for Idle/Inactive measurements is running), the UE keeps the measurement configuration(s) and the measurement result(s) unless the UE receives a new measurement configuration (e.g., unless the RRC Release like message includes a new Idle/Inactive measurement configuration(s)).

Third Solution: Upon transmitting a RRC Resume Request like message and, in response, receiving an RRC Release like message (e.g., while a timer for Idle/Inactive measurements is running), the UE keeps and updates the measurement configuration(s) and the measurement result(s) (e.g., keeps the measurement configuration(s) if the RRC release like message does not include a new Idle/Inactive measurement configuration(s) or updates the measurement configuration(s) if the RRC Release like message does include a new Idle/Inactive measurement configuration(s)).

Fourth Solution: Upon transmitting a RRC Resume Request like message and, in response, receiving an RRC Release like message (e.g., while a timer for Idle/Inactive measurements is running), the UE keeps the Idle/Inactive measurement configuration(s) if the RRC Release like message includes a suspendConfig (i.e., an indication that the UE remains in Inactive state) and otherwise releases the measurement configuration(s).

Fifth Solution: Upon transmitting a RRC Resume Request like message and, in response, receiving an RRC Resume like message (e.g., while a timer for Idle/Inactive measurements is running), the UE keeps the Idle/Inactive measurement configuration(s).

Additional details of each of these steps and solutions are provided below.

1.1 Step 1000: Receiving Idle/Inactive Measurement Configuration(s)

While in CONNECTED state or a power saving state when attempting to enter the CONNECTED state, the UE receives an RRC Release like message that triggers the UE to transition to a power saving state (e.g. INACTIVE, IDLE, IDLE with stored context, IDLE without stored context, etc.). The UE stores an idle/inactive measurement configuration(s) (e.g. for early measurement reporting) that may be contained in the RRC Release like message, and starts a timer (e.g., timer T331) with a received value (e.g., received in the RRC Release like message).

In some embodiments, the idle/inactive measurement configuration(s) contains configurations indicating what measurements the UE is to perform in a power saving state (e.g. INACTIVE, IDLE, etc.) such as a list of frequencies. For example, the idle/inactive measurement configuration(s) may contain a list of carrier frequency locations where Synchronization Signal Blocks (SSBs) are being transmitted, possibly signaled as a list of Absolute Radio Frequency Channel Numbers (ARFCNs) and, for each of the frequencies, cell quality derivation parameters, a parameter for beam measurements, etc. In some embodiments, the idle/inactive measurement configuration(s) contains configurations indicating what to measure and how the measurements are performed or criteria to store them e.g. only store measurement above a certain threshold. Further, in some embodiments, the idle/inactive measurement configuration(s) contains a timer value e.g. measIdleInactiveDuration. A timer (e.g., timer T331) is started with the received value when the message (i.e., the RRC Release like message) containing the measurement configuration is received.

In some embodiments, the idle/inactive configuration may be carried in a field measIdleInactiveConfig of Information Element (IE) MeasIdleInactiveConfigDedicated. As shown in the example below, that may contain a list of configurations provided per frequency of the same RAT or different RATs, e.g., NR and LTE in the example below. That frequency may be an SSB frequency, indicated by the ARFCN (i.e. a frequency information) indicating in which frequency the UE shall search for the SSBs and search for cells to measure.

```
RRCRelease-v16-IEs ::= SEQUENCE {
    measIdleInactiveConfig-r16     MeasIdleInactiveConfigDedicated-r16
OPTIONAL, -- Need N
    nonCriticalExtension       SEQUENCE { }                          OPTIONAL
}
MeasIdleInactiveConfigDedicated-r16 ::= SEQUENCE {
    measIdleInactiveCarrierListNR-r16               NR-CarrierList-r16 OPTIONAL, -- Need
N
    measIdleInactiveCarrierListEUTRA-r16            EUTRA-CarrierList-r16 OPTIONAL, --
Need N measIdleInactiveDuration-r16        ENUMERATED {sec10, sec30, sec60,
sec120,
                                                    sec180, sec240, sec300, spare},
    ...
}
EUTRA-CarrierList-r16 ::= SEQUENCE (SIZE (1..maxFreqIdleInactive)) OF
MeasIdleInactiveCarrierEUTRA-r16
measIdleInactiveCarrierListNR-r16::= SEQUENCE (SIZE (1..maxFreqIdleInactive)) OF
MeasIdleInactiveCarrierNR-r16
MeasIdleInactiveCarrierNR-r16:: =                SEQUENCE {
// NR related configuration for early measurements
    ssbFrequency                       ARFCN-ValueNR
OPTIONAL, -- Cond SSBorAssociatedSSB
    ssbSubcarrierSpacing               SubcarrierSpacing
OPTIONAL, -- Cond SSBorAssociatedSSB
    smtc1                        SSB-MTC
OPTIONAL, -- Cond SSBorAssociatedSSB
    smtc2                        SSB-MTC2
OPTIONAL, -- Cond IntraFreqConnected
    refFreqCSI-RS                ARFCN-ValueNR
OPTIONAL, -- Cond CSI-RS
    absThreshSS-BlocksConsolidation    ThresholdNR
OPTIONAL, -- Need R
    absThreshCSI-RS-Consolidation   ThresholdNR
OPTIONAL, -- Need R
    nrofSS-BlocksToAverage             INTEGER (2..maxNrofSS-BlocksToAverage)
OPTIONAL, -- Need R
    nrofCSI-RS-ResourcesToAverage   INTEGER (2..maxNrofCSI-RS-
ResourcesToAverage)                    OPTIONAL, -- Need R
    quantityConfigIndex                INTEGER (1..maxNrofQuantityConfig),
    freqBandIndicatorNR-v1530          FreqBandIndicatorNR
OPTIONAL, -- Need R
    quantityConfigIndex                INTEGER (1..maxNrofQuantityConfig),
    refFreqCSI-RS                ARFCN-ValueNR
OPTIONAL, -- Cond CSI-RS
    referenceSignalConfig              ReferenceSignalConfig,
// Beam Measurement configuration
    reportQuantityRS-Indexes           MeasReportQuantity
OPTIONAL, -- Need R
    maxNrofRS-IndexesToReport          INTEGER (1..maxNrofIndexesToReport)
OPTIONAL, -- Need R
    includeBeamMeasurements            BOOLEAN,
// Other early measurement configuration
    validityArea-r16             CellListNR-r16        OPTIONAL,   -- Need
N
    measCellListNR-r16           CellListNR-r16        OPTIONAL,   --
Need N
    reportQuantities             ENUMERATED {rsrp, rsrq, both},
    qualityThresholdNR-r16            SEQUENCE {
        idleInactiveRSRP-Threshold-r16 RSRP-Range                  OPTIONAL,   --
Need N
        idleInactiveRSRQ-Threshold-r16 RSRQ-Range                  OPTIONAL,   -- Need
N
        idleInactiveSINR-Threshold-r16 SINR-Range              OPTIONAL-- Need N
    }                                                   OPTIONAL,   -- Need N
    ...
}
CellListNR-r16 ::=   SEQUENCE (SIZE (1.. maxCellMeasIdleNR-r16)) OF PCI-
RangeIndexList
```

-continued

```
PCI-RangeElement ::=                    SEQUENCE {
    pci-RangeIndex                          PCI-RangeIndex,
    pci-Range                               PCI-Range
}
PCI-RangeIndex ::=                      INTEGER (1..maxNrofPCI-Ranges)
PCI-Range :: =                          SEQUENCE {
    start                                   PhysCellId,
    range                                   ENUMERATED {n4, n8, n12, n16, n24, n32, n48, n64, n84,
                                            n96, n128, n168, n252, n504, n1008,spare1}
OPTIONAL    -- Need S
}
MeasIdleInactiveCarrierEUTRA-r16::=      SEQUENCE {
    carrierFreq                             ARFCN-ValueEUTRA,
    allowedMeasBandwidth                        EUTRA-AllowedMeasBandwidth,
    validityArea                            EUTRA-CellList          OPTIONAL, -- Need N
    measCellList                            EUTRA-CellList          OPTIONAL, -- Need N
    reportQuantities                        ENUMERATED {rsrp, rsrq, both},
    qualityThreshold                        MeasTriggerQuantityEUTRA
    ...
}
EUTRA-CellList ::=     SEQUENCE (SIZE (1.. maxCellMeasIdleInactive)) OF EUTRA-PhysCellId
```

A UE variable to store the configuration may be defined e.g. VarMeasIdleInactiveConfig so that in the specifications a stored configuration may be used by another procedure. Upon reception of the configuration when the UE is CONNECTED this variable may be cleared i.e. it should be empty without any configuration stored. This UE variable could be defined as follows:

- VarMeasIdleInactiveConfig

The UE variable VarMeasIdleInactiveConfig includes the configuration of the measurements to be performed by the UE while in RRC_IDLE or RRC_INACTIVE for NR and/or E-UTRA inter-frequency measurements. The UE performs logging of these measurements only while in RRC_IDLE or RRC_INACTIVE.

VarMeasIdleInactiveConfig UE variable

```
-- ASN1START
-- TAG-VAR-MEAS-IDLE-INACTIVE-CONFIG-START
VarMeasIdleInactiveConfig-r16 ::= SEQUENCE {
    measIdleInactiveCarrierListNR-r16       NR-CarrierList-r16   OPTIONAL,  Need N
    measIdleInactiveCarrierListEUTRA-r16    EUTRA-CarrierList-r16 OPTIONAL,  Need N
    measIdleInactiveDuration-r16            ENUMERATED {sec10, sec30, sec60, sec120,
                                                        sec180, sec240, sec300, spare},
}
-- ASN1STOP
-- TAG-VAR-MEAS-IDLE-INACTIVE-CONFIG-START
```

Note that, in some embodiments, part of the measurement configuration may be absent in the RRC Release like message. In that case, the UE may acquire the measurement configuration from a system information block associated to the cell the UE is being suspended to INACTIVE or released to IDLE.

1.2 Step 1002; Performing Idle/Inactive Measurements

The UE performs measurements according to the received measurement configuration(s) upon entering the power saving state (e.g. INACTIVE or IDLE) while the timer (e.g. T331) (or its equivalent) is running. When the timer T331 expires, the UE stops performing the measurements. In some embodiments, the timer T331 (or equivalent) is stopped while the UE is in RRC_IDLE or RRC_INACTIVE if the UE selects/re-selects a cell that does not belong to a validity area configured in the measurement configuration, if such a concept is also defined in NR. A possible example of implementations is described below.

---

5.6.x Idle/Inactive Mode Measurements
5.6.x.1        General
This procedure specifies the measurements done by a UE in RRC_IDLE or
RRC_INACTIVE when it has an IDLE/INACTIVE mode measurement configuration and
the storage of the available measurements by a UE in RRC_IDLE, RRC_INACTIVE and
RRC_CONNECTED.
5.6.x.2        Initiation
While T331 is running, the UE shall:
    1> perform the measurements in accordance with the following:
        2>        for each entry in measIdleInactiveCarrierListEUTRA within
            VarMeasIdleInactiveConfig:
            3>        if UE supports carrier aggregation and/or dual connectivity between
                serving carrier and the carrier frequency and bandwidth indicated by
                carrierFreq and allowedMeasBandwidth within the corresponding entry;
            4>perform measurements in the carrier frequency and bandwidth indicated
                    by carrierFreq and allowedMeasBandwidth within the corresponding entry;
                NOTE:        The fields s-NonIntraSearch in EUTRA
                SystemInformationBlockType3 do not affect the UE measurement procedures
                in IDLE mode. How the UE performs measurements in IDLE mode is up to UE
                implementation as long as the requirements in TS 36.133 [16] are met for
                measurement reporting. UE is not required to perform idle measurements if
                SIB2 idle measurement indication is not configured.
            4>if the measCellList is included:
                5>   consider PCell and cells identified by each entry within the
                    measCellList to be applicable for idle mode measurement reporting;
            4>else:
                5>   consider PCell and up to maxCellMeasIdle strongest identified cells
                    whose RSRP/RSRQ measurement results are above the value(s)
                    provided in qualityThreshold (if any) to be applicable for idle mode
                    measurement reporting;
            4>store measurement results for cells applicable for idle mode measurement
                    reporting within the VarMeasIdleInactiveReport;
        3>       else:
            4>do not consider the carrier frequency to be applicable for idle mode
                    measurement reporting;
        2>        for each entry in measIdleInactiveCarrierListNR within
            VarMeasIdleInactiveConfig:
            3>        if UE supports carrier aggregation and/or dual connectivity (or any form of
                MR-DC) between serving carrier and the carrier frequency indicated by
                ssbFrequency within the corresponding entry;
            4>perform measurements in the carrier frequency and bandwidth indicated
                    by ssbFrequency within the corresponding entry;
            4>if the measCellListNR-r16 is included:
                5>   consider PCell and cells identified by each entry within the
                    measCellListNR-r16 to be applicable for idle/inactive mode
                    measurement reporting;
            4>else:
                5>   consider PCell and up to maxCellMeasIdleNR-r16 strongest
                    identified cells whose RSRP/RSRQ/SINR measurement results are above
                    the value(s) provided in qualityThresholdNR (if any) to be applicable for
                    idle mode measurement reporting;
            4>if the reportQuantityRS-Indexes and maxNrofRS-IndexesToReport is
                included:
                5>   perform measurements for the indicated measurement quantities in
                    reportQuantityRS-Indexes whose RSRP/RSRQ/SINR measurement
                    results are above the value(s) provided in absThreshSS-
                    BlocksConsolidation or absThreshCSI-RS-Consolidation   (if any);
            4>store measurement results for cells applicable for idle mode measurement
                    reporting within the VarMeasIdleReport;
        3>       else:
            4>do not consider the carrier frequency to be applicable for idle/inactive
                    mode measurement reporting;
    1> if validityArea is configured in VarMeasIdleInactiveConfig and UE reselects to a
        serving cell whose physical cell identity does not match any entry in validityArea
        for the corresponding carrier frequency:
        2>        stop T331;

1.3 Step 1004: Performing a 2-Step Resume/Release while Performing the Idle/Inactive Measurements, Wherein the UE Handles the Idle/Inactive Measurement Configuration(s) when Performing the 2-Step Resume/Release, in Accordance with any One of a Number of Solutions Described Herein While the timer (e.g., T331) controlling measurements in the power saving state (e.g. INACTIVE, IDLE, etc.) is running, the UE tries to resume an RRC connection (e.g., by transmitting an RRC Resume Request like message). In response, the UE receives an RRC Release like message (e.g., RRCRelease) or an RRC Resume like message (e.g., RRCResume). Below, a number of different solutions are provided including scenarios when the UE receives an RRC Release like message and when the UE receives an RRC Resume like message. In all of these scenarios, the UE performs one or more actions to handle the Idle/Inactive measurement configuration(s) for the power saving state (e.g. for early measurement reporting) and measurements associated to the configuration(s).

1.3.1 First Solution: Release Measurement Configuration and Measurement Results when Receiving RRC Release Message In the first solution, while the timer (e.g., T331) controlling measurements in the power saving state (e.g. INACTIVE, IDLE, etc.) is running, the UE tries to resume an RRC connection (e.g., by transmitting an RRC Resume Request like message). In response, the UE receives an RRC Release like message (e.g., RRCRelease). Upon receiving the RRC Release like message while the timer is running, the UE stops the timer (e.g. T331) and performs a set of cleaning actions such as, e.g., clearing (i.e., releasing) the measurement configuration(s) and measurement results. In some embodiments, this may be modeled by clearing UE variables storing the measurement configuration and the measurement results. In that case, UE variables are defined in case these configurations need to be used in another procedure e.g. when the UE performs cell reselection and needs to re-acquire the configuration from system information.

In some embodiments, if the RRC Release like message contains a new Idle/Inactive measurement configuration, the UE stores the new measurement configuration (e.g. in a UE variable for measurement configuration that has been cleared), starts the timer T331 (or equivalent) with the value provided in the new measurement configuration, and starts performing measurements in power saving mode according to the new measurement configuration while the timer is running.

In some embodiments, in terms of signaling, that may be implemented in the specifications by defining in the RRC Release like message that the measurement configuration is OPTIONAL with Need Code R i.e. upon absence the configuration is released.

```
RRCRelease-v16-IEs ::= SEQUENCE {
    measIdleInactiveConfig-r16    MeasIdleInactiveConfigDedicated-r16
    OPTIONAL, -- Need R
    nonCriticalExtension    SEQUENCE { }    OPTIONAL
}
```

An alternative implementation of this could be to use the need code Need S, i.e. to specify the UE behavior if the field is absent:

```
RRCRelease-v16-IEs ::= SEQUENCE {
    measIdleInactiveConfig-r16    MeasIdleInactiveConfigDedicated-r16
    OPTIONAL, -- Need S
    nonCriticalExtension    SEQUENCE { }    OPTIONAL
}
```

RRCRelease field descriptions measIdleInactiveConfig
Indicates a measurement configuration to be stored and used by the UE while in RRC_IDLE or RRC_INACTIVE. If the field is absent, the UE shall release the VarMeasIdleInactiveConfig, if stored.

The UE behavior when receiving the RRCRelease message could be implemented in 3GPP TS 38.331 as e.g.:

5.3.8.3    Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> stop timer T390, if running;
1> stop timer T331, if running;
...
1> if the RRCRelease message includes the measIdleInactiveConfig-r16:
    2>    release (or remove or clear) the VarMeasInactiveIdleReport;
    2>    store the received measIdleDuration in VarMeasIdleInactiveConfig;
    2>    start T331 with the value of measIdleDuration;
    2>    if the measIdleInactiveConfig-r16 contains measIdleInactiveCarrierListEUTRA:
        3>    store the received measIdleInactiveCarrierListEUTRA in VarMeasIdleInactiveConfig;

```
    2>          else:
        3>          store the measIdleInactiveCarrierListEUTRA received in a system
            information block (SIB) in VarMeasIdleInactiveConfig, if
            transmitted;
    2>          if the measIdleInactiveConfig-r16 contains
        measIdleInactiveCarrierListNR:
        3>          store the received measIdleInactiveCarrierListNR in
            VarMeasIdleInactiveConfig;
    2>          else:
        3>          store the measIdleInactiveCarrierListEUTRA received in a system
            information block (SIB) in VarMeasIdleInactiveConfig, if
            transmitted;
    2>          start performing idle mode measurements as specified in 5.6.x;
...
5.6.x.3         T331 expiry or stop
The UE shall:
    1> if T331 expires or is stopped:
        2>          release (or remove or clear) the VarMeasIdleInactiveConfig;
```

Below, an illustration is provided of what may be reported in the idle/inactive early measurement report e.g. multiplexed with or within a Resume Request, multiplexed or within an RRC Resume Complete or within a UE Information Response e.g. in 3GPP TS 38.331:

- MeasResults
The IE MeasResults covers measured results for intra-frequency, inter-frequency and inter- RAT mobility.

| MeasResults information element |
| --- |

```
MeasResultListIdleInactive-r16 ::= SEQUENCE (SIZE (1..maxIdleMeasCarriers-r16)) OF
MeasResultIdleInactive-r16
MeasResultIdleInactive-r16 ::= SEQUENCE {
    measResultServingCell-r16               SEQUENCE {
        resultsSSB-Cell                         MeasQuantityResults     OPTIONAL,
        resultsCSI-RS-Cell                      MeasQuantityResults     OPTIONAL,
        rsIndexResults                      SEQUENCE{
            resultsSSB-Indexes                      ResultsPerSSB-IndexList OPTIONAL,
            resultsCSI-RS-Indexes                   ResultsPerCSI-RS-IndexList OPTIONAL
        }                                                           OPTIONAL
    },
    measResultNeighCells-r16            CHOICE {
        measResultIdleListEUTRA-r16   MeasResultIdleListEUTRA-r16,
        measResultIdleListNR      MeasResultIdleListNR,
        ...
    }                                                           OPTIONAL,
    ...
}
MeasResultIdleListEUTRA-r16 ::= SEQUENCE (SIZE (1..maxCellMeasIdle-
r16)) OF MeasResultIdleEUTRA-r16
MeasResultIdleListNR ::= SEQUENCE (SIZE (1..maxCellMeasIdle-r16)) OF
MeasResultIdleNR-r16
MeasResultIdleEUTRA-r16 ::= SEQUENCE {
    eutra-CarrierFreq-r16                   ARFCN-ValueEUTRA
OPTIONAL,
    eutra-PhysCellId-r16                    EUTRA-PhysCellId
OPTIONAL,
    eutra-MeasResult-r16                    MeasQuantityResultsEUTRA
OPTIONAL,
    ...
}
MeasResultIdleNR-r16 ::= SEQUENCE {
    ssbFrequency            ARFCN-ValueNR           OPTIONAL,
    physCellId              PhysCellId OPTIONAL,
    measResult              SEQUENCE {
        cellResults             SEQUENCE{
            resultsSSB-Cell             MeasQuantityResults OPTIONAL,
            resultsCSI-RS-Cell          MeasQuantityResults OPTIONAL
        },
        rsIndexResults          SEQUENCE{
            resultsSSB-Indexes          ResultsPerSSB-IndexList
```

```
    OPTIONAL,
        resultsCSI-RS-Indexes          ResultsPerCSI-RS-IndexList
    OPTIONAL
        } OPTIONAL
    },
    ...
```

The definition of the timer T331 can be described in 3GPP TS 38.331 as e.g.:

| Timer | Start | Stop | At expiry |
|---|---|---|---|
| T331 | Upon receiving RRCRelease message including measIdleInactiveConfig. | Upon receiving RRCSetup, RRCResume, RRCRelease or, if validityArea is configured, upon reselecting to cell that does not belong to validityArea. | Release the stored VarMeasIdleInactiveConfig. |

In one variant of the UE behavior, the UE only clears the measurements if a new configuration for new measurements is received; otherwise, the UE may still keep them stored. Notice that the UE also stops the timer when UE enters CONNECTED, but then the UE does not delete the measurements that are going to be reported.

In one variant, when the timer T331 (or equivalent) expires, the UE releases the VarMeasIdleInactiveConfig that contains the measurement configuration i.e. the variable becomes empty and UE has no configuration. Note that "releasing" the variable is also known as "clearing" or "removing" the variable. In the variant above, when the timer T331 (or equivalent) expires the UE also releases the measurements stored (i.e. it may release/remove/clear the VarMeasInactiveIdleReport, where measurements are stored). Again, note that "releasing" the measurements is also known as "clearing" or "removing" the measurements.

In another variant, when the timer T331 (or equivalent) expires, the UE does not release/remove/clear the stored measurements. Hence, even if the UE is no longer performing measurements when it resumes or setups a connection, the UE may still report the measurements.

Advantages of the first solution: Compared to existing solution, this solution is consistent and simple. It allows the possibility to receive an RRC Release in response to an RRC Resume, stop the measurements configured by the last serving node (e.g. where the UE was suspended or released) and remove the stored measurements. But, it also allows the network to configure the UE again with new measurement configuration for similar purpose. Another potential advantage of this solution is that the UE and network would not necessarily have to store the idle/inactive measurement configuration in the UE Inactive AS context.

1.3.2 Second Solution: Keep Idle/Inactive Measurement Configurations when Receiving RRC Release Message Unless Receiving New Configuration In the second solution, while the timer (e.g., T331) controlling measurements in the power saving state (e.g. INACTIVE, IDLE, etc.) is running, the UE tries to resume an RRC connection (e.g., by transmitting an RRC Resume Request like message). In response, the UE receives an RRC Release like message (e.g., RRCRelease). In the second solution, the RRC Release like message is received while the timer is running and does not contain a measurement configuration for measurements in IDLE/INACTIVE e.g. for early measurement reporting. Upon receiving the RRC Release like message that does not contain a measurement configuration for measurements in Idle/Inactive while the timer is running, the UE does not stop the timer (e.g. T331) and does not perform a set of cleaning actions (e.g., does not clearing (i.e., releasing) the measurement configuration(s) and measurement results or in other words does not clear the UE (containing the measurement configuration and measurement results)). Hence, the absence of the measurement configuration (e.g., the absence of the measurement configuration field (e.g. measIdleInactiveConfig-r16)) in the RRC Release like message indicates that the UE is to continue performing measurements that have been previously configured. That case may be interesting in case the UE tried to resume and was released or suspended by the network, possibly without using context fetching (e.g. in an RNA update without context fetching where the last serving node suspends/Releases the UE).

Otherwise, if the UE receives an RRC release like message (in response to an RRC Resume like message) while timer T331 (or equivalent) is running and the message contains a measurement configuration for measurements in IDLE/INACTIVE e.g. for early measurement reporting, the UE stops the timer (e.g. T331) and performs a set of cleaning actions (i.e. clears the UE variables containing the measurement configuration and measurement results).

In some embodiments, the measIdleInactiveConfig-r16 may be optional and have a need code N, i.e., no action is performed upon absence (and UE continues doing what it has been configured previously). In that case, the presence leads to a one-time action which is the clearing of the stored configurations, and storage of the new configuration in the UE variable.

In some embodiments, the presence of the measIdleInactiveConfig-r16 (or equivalent field with the measurement configuration) indicates that the UE first stops the timer T331, perform the clean-up actions, store the new configuration(s), and starts the measurement procedures according to it. One example implementation in 3GPP TS 38.331 is shown below.

```
RRCRelease-v16-IEs ::= SEQUENCE {
  measIdleInactiveConfig-r16    MeasIdleInactiveConfigDedicated-r16
  OPTIONAL, -- Need N
  nonCriticalExtension    SEQUENCE { }    OPTIONAL
}
...
```
The procedure in TS 38.331 could be updated to e.g.:
5.3.8.3  Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> stop timer T390, if running;

...
1> if the RRCRelease message includes the measIdleInactiveConfig-r16:
   2>  stop timer T331, if running;
   2>  release (or remove or clear) the VarMeasInactiveIdleReport;
   2>  store the received measIdleDuration in VarMeasIdleInactiveConfig;
   2>  start T331 with the value of measIdleDuration;
   2>  if the measIdleInactiveConfig-r16 contains measIdleInactiveCarrierListEUTRA:
      3> store the received measIdleInactiveCarrierListEUTRA in VarMeasIdleInactiveConfig;
   2>  else:
      3> store the measIdleInactiveCarrierListEUTRA received in a system information block (SIB) in VarMeasIdleInactiveConfig, if transmitted;
   2>  if the measIdieInactiveConfig-r16 contains measIdleInactiveCarrierListNR:
      3> store the received measIdleInactiveCarrierListNR in VarMeasIdleInactiveConfig;
   2>  else:
      3> store the measIdleInactiveCarrierListEUTRA received in a system information block (SIB) in VarMeasIdleInactiveConfig, if transmitted;
   2>  start performing idle mode measurements as specified in 5.6.x;
...
5.6.X.3  T331 expiry or stop
The UE shall:
1> if T331 expires or is stopped:
   2>  release (or remove or clear) the VarMeasIdleInactiveConfig;
      NOTE: It is up to UE implementation whether to continue IDLE/INACTIVE mode measurements according to SIB configuration after T331 has expired or stopped.

In the variant above, when the timer T331 (or equivalent) expires, the UE releases the VarMeasIdleInactiveConfig that contains the measurement configuration i.e. the variable becomes empty and UE has no configuration. In the variant above, when the timer T331 (or equivalent) expires the UE also releases/clears/removes the measurements stored (i.e. it may release/remove/clear the VarMeasInactiveIdleReport, where measurements are stored).

In another variant, when the timer T331 (or equivalent) expires the UE does not release/remove/clear the measurements stored. Hence, even if the UE is not performing measurements any more when it resumes or setups a connection it may still report the measurements.

In another variant, instead of stopping the timer T331 (or equivalent) to then start again with the new value received in the RRC Release like message, the time is re-started with the new value. In this case, the procedure om 3GPP TS 38.331 could be updated to e.g.:

5.3.8.3  Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;

```
1> stop timer T380, if running;
1> stop timer T320, if running;
1> stop timer T390, if running;
...
1> if the RRCRelease message includes the measIdleInactiveConfig-r16:
    2>    release (or remove or clear) the VarMeasInactiveIdleReport;
    2>    store the received measIdleDuration in VarMeasIdleInactiveConfig;
    2>    re-start T331 with the value of measIdleDuration;
    2>    if the measIdleInactiveConfig-r16 contains
       measIdleInactiveCarrierListEUTRA:
       3>   store the received measIdleInactiveCarrierListEUTRA in
          VarMeasIdleInactiveConfig;
    2>    else:
       3>   store the measIdleInactiveCarrierListEUTRA received in a system
          information block (SIB) in VarMeasIdleInactiveConfig, if transmitted;
    2>    if the measIdleInactiveConfig-r16 contains measIdleInactiveCarrierListNR:
       3>   store the received measIdleInactiveCarrierListNR in
          VarMeasIdleInactiveConfig;
    2>    else:
       3>   store the measIdleInactiveCarrierListEUTRA received in a system
          information block (SIB) in VarMeasIdleInactiveConfig, if transmitted;
    2>    start performing idle mode measurements as specified in 5.6.x;
```

Advantages of the second solution: Compared to the first solution, this solution allows the network to let the UE continue to do what it has been configured by the source node when it was suspended last time (e.g. from CONNECTED) and possibly not bother to change that configuration (e.g. add or remove measurement configurations). At the same time, if network wants to, it still allows in the RRC Release to provide a new configuration. And, upon that case, UE deletes whatever it has stored and replaces with new configurations and starts new measurements in power saving state.

1.3.3 Third Solution: Keep and Update Idle/Inactive Measurement Configurations when Receiving RRC Release Message In the third solution, while the timer (e.g., T331) controlling measurements in the power saving state (e.g. INACTIVE, IDLE, etc.) is running, the UE tries to resume an RRC connection (e.g., by transmitting an RRC Resume Request like message). In response, the UE receives an RRC Release like message (e.g., RRCRelease). In the third solution, the RRC Release like message is received while the timer is running and does not contain a measurement configuration for measurements in IDLE/INACTIVE e.g. for early measurement reporting. Upon receiving the RRC Release like message that does not contain a measurement configuration for measurements in Idle/Inactive while the timer is running, the UE does not stop the timer (e.g. T331) and does not perform a set of cleaning actions (e.g., does not clear (i.e., release) the measurement configuration(s) and measurement results or in other words does not clear the UE variables containing the measurement configuration and measurement results). Hence, the absence of the measurement configuration (e.g., the absence of the measurement configuration field (e.g. measIdleInactiveConfig-r16)) in the RRC Release like message indicates that the UE is to continue performing measurements that have been previously configured. That case may be applied in case the UE tried to resume and was released/suspended by the network, possibly without using context fetching (e.g. in an RNA update without context fetching where the last serving node suspends/Releases the UE).

However, differently from the second solution, else if the UE receives an RRC release like message in response to an RRC Resume like message while timer T331 (or equivalent) is running and the message contains a measurement configuration for measurements in IDLE/INACTIVE e.g. for early measurement reporting, the UE may perform at least one of the following actions:

The UE adds a new entry in its stored measurement configuration i.e. the UE adds a new carrier frequency to its list of stored measurement configurations.
   In one variant, upon addition, the UE re-starts the timer T331 (or equivalent) with a stored value in the UE variable containing the configuration.
   In one variant, upon addition, the UE does not re-start the timer T331 (or equivalent).

The UE modifies a stored configuration in its stored measurement configuration i.e. the UE changes any field defined per carrier frequency in its list of stored measurement configurations.
   In one variant, upon modification, the UE re-starts the timer T331 (or equivalent) with a stored value in the UE variable containing the configuration.
   In one variant, upon modification, the UE does not re-start the timer T331 (or equivalent).

The UE removes an existing entry in its list of stored measurement configurations and stops performing measurement according to the removed configuration.

In some embodiments, the third solution relies on a structure based on AddMod and Remove lists for the measurement configurations. In order to add or remove items from the configurations, the top level field needs to be Need M, i.e. maintain if not included. An example of the RRC Release message is shown below:

```
RRCRelease-v16-IEs ::= SEQUENCE {
    measIdleInactiveConfig-r16    MeasIdleInactiveConfigDedicated-r16
    OPTIONAL, -- Need M
    nonCriticalExtension    SEQUENCE { }    OPTIONAL
}
MeasIdleInactiveConfigDedicated-r16 :: = SEQUENCE {
```

-continued

```
    measIdleInactiveCarrierToRemoveListNR-r16
    MeasIdleInactiveCarrierToRemoveListNR-r16   OPTIONAL   --Need
N,
    measIdleInactiveCarrierToAddModListNR-r16
    MeasIdleInactiveCarrierToAddModListNR-r16   OPTIONAL   --Need
N,
    measIdleInactiveCarrierToRemoveListEUTRA-r16
    MeasIdleInactiveCarrierToRemoveListEUTRA-r16   OPTIONAL   --
Need N,
    measIdleInactiveCarrierToAddModListEUTRA-r16
    MeasIdleInactiveCarrierToAddModListEUTRA-r16   OPTIONAL   --
Need N,
       measIdleInactiveDuration-r16          ENUMERATED {sec10, sec30, sec60, sec120,
                                             sec180, sec240, sec300, spare},
       ...
}
MeasIdleInactiveCarrierToRemoveListNR-r16::= SEQUENCE (SIZE
(1..maxFreqIdleInactiveNR)) OF MeasIdleInactiveCarrierNR-Id-r16
MeasIdleInactiveCarrierToRemoveListEUTRA-r16::= SEQUENCE (SIZE
(1..maxFreqIdleInactiveEUTRA)) OF MeasIdleInactiveCarrierEUTRA-Id-r16
- MeasIdleInactiveCarrierNR-Id
The IE MeasIdleInactiveCarrierNR-Id used to identify an NR idle/inactive measurement
configuration e.g. for early measurement reporting.
```

| MeasIdleInactiveCarrierNR-Id information element |
|---|

```
-- ASN1START
-- TAG-MEASIDLEINACTIVECARRIERNR-ID-START
MeasIdleInactiveCarrierNR-Id ::=                        INTEGER
(1..maxNrofMeasIdleInactiveCarrierNR-Id)
-- TAG-MEASIDLEINACTIVECARRIERNR-ID-STOP
-- ASN1STOP
-        MeasIdleInactiveCarrierToAddModListNR
The IE MeasIdleInactiveCarrierToAddModListNR concerns a list of NR idle/inactive
measurement configurations to add or modify.
```

| MeasIdleInactiveCarrierToAddModListNR information element |
|---|

```
-- ASN1START
-- TAG-MEASIDLEINACTIVECARRIERTOADDMODLISTNR-START
MeasIdleInactiveCarrierToAddModListNR::=         SEQUENCE (SIZE (1..
maxNrofMeasIdleInactiveCarrierNR-Id)) OF MeasIdleInactiveCarrierToAddModNR
MeasIdleInactiveCarrierToAddModNR::=             SEQUENCE {
    measIdleInactiveCarrierNR-Id           MeasIdleInactiveCarrierNR-Id,
    measIdleInactiveConfig-r16             MeasIdleInactiveConfigDedicated-r16
}
-- TAG-MEASIDLEINACTIVECARRIERTOADDMODLISTNR-STOP
-- ASN1STOP
-        MeasIdleInactiveCarrierEUTRA-Id
The IE MeasIdleInactiveCarrierEUTRA-Idnused to identify an E-UTRA idle/inactive
measurement configuration e.g. for early measurement reporting.
```

| MeasIdleInactiveCarrierEUTRA-Id information element |
|---|

```
-- ASN1START
-- TAG-MEASIDLEINACTIVECARRIEREUTRA-ID-START
MeasIdleInactiveCarrierEUTRA-Id :: =                   INTEGER
(1..maxNrofMeasIdleInactiveCarrierEUTRA-Id)
-- TAG-MEASIDLEINACTIVECARRIEREUTRA-ID-STOP
-- ASN1STOP
-        MeasIdleInactiveCarrierToAddModListEUTRA
The IE MeasIdleInactiveCarrierToAddModListEUTRA concerns a list of E-UTRA
idle/inactive measurement configurations to add or modify.
```

| MeasIdleInactiveCarrierToAddModListEUTRA information element |
|---|

```
-- ASN1START
-- TAG-MEASIDLEINACTIVECARRIERTOADDMODLISTEUTRA-START
MeasIdleInactiveCarrierToAddModListEUTRA::=      SEQUENCE (SIZE (1..
maxNrofMeasIdleInactiveCarrierEUTRA-Id)) OF
MeasIdleInactiveCarrierToAddModEUTRA
MeasIdleInactiveCarrierToAddModEUTRA::=          SEQUENCE {
    measIdleInactiveCarrierEUTRA-Id        MeasIdleInactiveCarrierEUTRA-Id,
    measIdleInactiveConfig-r16             MeasIdleInactiveConfigDedicated-r16
}
-- TAG-MEASIDLEINACTIVECARRIERTOADDMODLISTEUTRA-STOP
-- ASN1STOP
```

To capture the UE behavior, the procedures in TS 38.331 can be updated to e.g.:

---

5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> stop timer T390, if running;
...
1> if the RRCRelease message includes the measIdleInactiveConfig-r16:
    2> start T331 with the value of measIdleDuration;
    2> if the received measIdleInactiveConfig-r16 includes the measIdleInactiveCarrierToRemoveListNR:
        3> perform the Idle/Inactive measurement configuration removal procedure as specified in 5.3.8.3.y;
    2> if the received measIdleInactiveConfig-r16 includes the measIdleInactiveCarrierToRemoveListEUTRA:
        3> perform the Idle/Inactive measurement configuration removal procedure as specified in 5.3.8.3.y;
    2> if the received measIdleInactiveConfig-r16 includes the measIdleInactiveCarrierToAddModListNR:
        3> perform the Idle/Inactive measurement configuration addition/modification as specified in 5.3.8.3.x;
    2> if the received measIdleInactiveConfig-r16 includes the measIdleInactiveCarrierToAddModListEUTRA:
        3> perform the Idle/Inactive measurement configuration addition/modification as specified in 5.3.8.3.x;
...

5.3.8.3.x Idle/Inactive measurement configuration removal
The UE shall:
1> for each measIdleInactiveCarrierNR-Id included in the received measIdleInactiveCarrierToRemoveListNR that is part of measIdleInactiveCarrierListNR in VarMeasIdleInactiveConfig:
    2> remove the entry with the matching measIdleInactiveCarrierNR-Id from the measIdleInactiveCarrierListNR within the VarMeasIdleInactiveConfig;
    2> remove all measurements associated to this configuration being removed, if any;
1> for each measIdleInactiveCarrierEUTRA-Id included in the received measIdleInactiveCarrierToRemoveListEUTRA that is part of measIdleInactiveCarrierListEUTRA in VarMeasIdleInactiveConfig:
    2> remove the entry with the matching measIdleInactiveCarrierEUTRA-Id from the measIdleInactiveCarrierListEUTRA within the VarMeasIdleInactiveConfig;
    2> remove all measurements associated to this configuration being removed, if any;
1> if there are no configurations left (i.e. both the NR and E-UTRA lists is empty), stop the timer T331;
NOTE: The UE does not consider the message as erroneous if the measIdleInactiveCarrierToRemoveListNR includes any measIdleInactiveCarrierNR-Id value or if the measIdleInactiveCarrierToRemoveListEUTRA includes any measIdleInactiveCarrierEUTRA-Id value that is not part of the current UE configuration.

5.3.8.3.y Idle/inactive measurement configuration addition/modification
The UE shall:
1> for each measIdleInactiveCarrierNR-Id included in the received measIdleInactiveCarrierToAddModListNR:
    2> if an entry with the matching measIdleInactiveCarrierNR-Id exists in the measIdleInactiveCarrierListNR within the VarMeasIdleInactiveConfig, for this entry:
        3> remove measurements associated with this configuration, if any;
        3> reconfigure the entry in VarMeasIdleInactiveConfig with the value received for this configuration;
    2> else:
        3> add a new entry for the received configuration to the measIdleInactiveCarrierListNR within VarMeasIdleInactiveConfig.
1> for each measIdleInactiveCarrierEUTRA-Id included in the received measIdleInactiveCarrierToAddModListEUTRA:
    2> if an entry with the matching measIdleInactiveCarrierEUTRA-Id exists in the measIdleInactiveCarrierListEUTRA within the VarMeasIdleInactiveConfig, for this entry:
        3> remove measurements associated with this configuration, if any;
        3> reconfigure the entry in VarMeasIdleInactiveConfig with the value received for this configuration;

```
        2>            else:
            3>            add a new entry for the received configuration to the
                          measIdleInactiveCarrierListEUTRA within VarMeasIdleInactiveConfig.
    1> start performing idle mode measurements as specified in 5.6.x;
5.6.x.3                   T331 expiry or stop
The UE shall:
    1 > if T331 expires or is stopped:
        2>            release (or remove or clear) the VarMeasIdleInactiveConfig;
                      NOTE: It is up to UE implementation whether to continue
                      IDLE/INACTIVE mode measurements according to SIB
                      configuration after T331 has expired or stopped.
```

Advantages of the third solution: Compared to previous solutions, this solution allows the network substantial flexibility to add, remove, or modify measurement configurations without necessarily discontinuing measurements at the UE.

1.3.4 Fourth Solution: Keep Measurement Configurations if Receiving RRC Release with Suspend Config, Otherwise Release the Measurement Configurations In the fourth solution, while the timer (e.g., T331) controlling measurements in the power saving state (e.g. INACTIVE, IDLE, etc.) is running, the UE tries to resume an RRC connection (e.g., by transmitting an RRC Resume Request like message). In response, the UE receives an RRC Release like message (e.g., RRCRelease). In the fourth solution, the RRC Release like message contains a suspendConfig (i.e., an indication that the UE remains in INACTIVE state). Upon receiving the RRC Release like message that contains a suspendConfig (i.e., an indication that the UE remains in INACTIVE state) while the timer is running, the UE operates in accordance with any one of the first, second, or third solutions. Else, if the RRC Release like message does not contain a suspendConfig, which is an indication that the UE is to transition to IDLE state, the UE stops the timer T331 and performs the set of clean up actions such as deleting the measurements, deleting the configurations, and clearing the UE variables.

For the different solutions for the handling of idle/inactive measurement configuration described above (perhaps with the exception of the first solution), the target network node where the UE tries to resume could know the existing inactive/idle configuration the UE has stored before making a decision to either add, remove, or delete a measurement configuration and/or making a decision to stop or continue measurements. At the UE, one solution is to store the inactive/idle measurement configuration in the UE Inactive AS Context. At the network side, the inactive/idle measurement configuration is also stored (e.g., the in UE Inactive AS Context) at the node suspending the UE. Upon transmission of an RRC Resume Request like message, since the UE may possibly receive an RRC Release message containing an indication on how the UE is to handle the idle/inactive measurement configuration, the UE restores the UE Inactive AS context including the inactive/idle measurement configuration so that it could be replaced, removed, added, etc. This may be implemented in 3GPP 38.331 as follows:

```
5.3.8.3                  Reception of the RRCRelease by the UE
The UE shall:
    1> delay the following actions defined in this sub-clause 60 ms from the moment the
       RRCRelease message was received or optionally when lower layers indicate that
       the receipt of the RRCRelease message has been successfully acknowledged,
       whichever is earlier;
    1> stop timer T380, if running;
    1> stop timer T320, if running;
    1> stop timer T390, if running;
    1> if the security is not activated, perform the actions upon going to RRC_IDLE as
       specified in 5.3.11 with the release cause 'other' upon which the procedure ends;
    1> if the RRCRelease message includes redirectedCarrierInfo indicating redirection to
       eutra:
        2>            if cnType is included:
            3>            after the cell selection, indicate the available CN Type(s) and the received
                          cnType to upper layers;
        NOTE:         Handling the case if the E-UTRA cell selected after the redirection does not
                      support the core network type specified by the cnType, is up to UE
                      implementation.
    1> if the RRCRelease message includes the cellReselectionPriorities:
        2>            store the cell reselection priority information provided by the
                      cellReselectionPriorities;
        2>            if the t320 is included:
            3>            start timer T320, with the timer value set according to the value of t320;
    1> else:
        2>            apply the cell reselection priority information broadcast in the system
                      information;
    1> if deprioritisationReq is included:
        2>            start or restart timer T325 with the timer value set to the
                      deprioritisationTimer signalled;
        2>            store the deprioritisationReq until T325 expiry;
    1> if the RRCRelease includes suspendConfig:
        2>            apply the received suspendConfig;
        2>            reset MAC and release the default MAC Cell Group configuration, if any;
        2>            re-establish RLC entities for SRB1;
```

```
    2>           if the RRCRelease message with suspendConfig was received in response
          to an RRCResumeRequest or an RRCResumeRequest1:
       3>           stop the timer T319 if running;
       3>           in the stored UE Inactive AS context:
          4> replace the K_gNB and K_RRCint keys with the current K_gNB and K_RRCint keys;
          4>replace the C-RNTI with the temporary C-RNTI in the cell the UE has
             received the RRCRelease message;
          4>replace the cellIdentity with the cellIdentity of the cell the UE has received
             the RRCRelease message;
          4>replace the physical cell identity with the physical cell identity of the cell
             the UE has received the RRCRelease message;
          4>replace the suspendConfig with the current suspendConfig;
    2>           else:
       3>           store in the UE Inactive AS Context the received suspendConfig,
          the received inactive/idle measurement configuration, all current
          parameters configured with RRCReconfiguration or RRCResume,
          the current K_gNB and K_RRCint keys, the ROHC state, the C-RNTI used
          in the source PCell, the cellIdentity and the physical cell identity of
          the source PCell;
    2>           suspend all SRB(s) and DRB(s), except SRB0;
    2>           indicate PDCP suspend to lower layers of all DRBs;
    2>           if the t380 is included:
       3>           start timer T380, with the timer value set to t380;
    2>           if the RRCRelease message is including the waitTime:
       3>           start timer T302 with the value set to the waitTime;
       3>           inform the upper layer that access barring is applicable for all access
          categories except categories '0' and '2';
    2>           indicate the suspension of the RRC connection to upper layers;
    2>           enter RRC_INACTIVE and perform cell selection as specified in TS 38.304
       [20];
 1> else
    2>           perform the actions upon going to RRC_IDLE as specified in 5.3.11, with
       the release cause 'other'.
. . .
5.3.13.3                  Actions related to transmission of RRCResumeRequest or
RRCResumeRequest1 message
The UE shall set the contents of RRCResumeRequest or RRCResumeRequest1 message
as follows:
 1> if field useFullResumeID is signalled in SIB1:
    2>           select RRCResumeRequest1 as the message to use;
    2>           set the resumeIdentity to the stored fullI-RNTI value;
 1> else:
    2>           select RRCResumeRequest as the message to use;
    2>           set the shortResumeIdentity to the stored shortI-RNTI value;
 1> restore the RRC configuration (including the idle/inactive measurement
    configuration) and security context from the stored UE AS context except the
    cellGroupConfig;
 1> set the resumeMAC-I to the 16 least significant bits of the MAC-I calculated:
    2>           over the ASN.1 encoded as per clause 8 (i.e., a multiple of 8 bits)
       VarResumeMAC-Input;
    2>           with the K_RRCint key in the UE Inactive AS Context and the previously
       configured integrity protection algorithm; and
    2>           with all input bits for COUNT, BEARER and DIRECTION set to binary ones;
Editor's Note: FFS Additional input to VarResumeMAC-Input (replay attacks
                  mitigation).
 1> restore the RRC configuration and the K_gNB and K_RRCint keys from the UE Inactive
    AS context except the cellGroupConfig and pdcp-Config;
 1> derive the K_gNB key based on the current K_gNB or the NH, using the stored
    nextHopChainingCount value, as specified in TS 33.501 [11];
 1> derive the K_RRCenc key, the K_RRCint key, the K_UPint key and the K_UPenc key;
 1> configure lower layers to apply integrity protection for all radio bearers except
    SRB0 using the configured algorithm and the K_RRCint key and K_UPint key derived in
    this subclause immediately, i.e., integrity protection shall be applied to all
    subsequent messages received and sent by the UE;
NOTE 1:          Only DRBs with previously configured UP integrity protection shall resume
                  integrity protection.
 1> configure lower layers to apply ciphering for all radio bearers except SRB0 and to
    apply the configured ciphering algorithm, the K_RRCenc key and the K_UPenc key derived
    in this subclause, i.e. the ciphering configuration shall be applied to all subsequent
    messages received and sent by the UE;
 1> re-establish PDCP entities for SRB1;
 1> resume SRB1;
 1> submit the selected message RRCResumeRequest or RRCResumeRequest1 for
    transmission to lower layers.
```

-continued

NOTE 2: Only DRBs with previously configured UP ciphering shall resume ciphering.
If lower layers indicate an integrity check failure while T319 is running, perform actions specified in 5.3.13.5.
The UE shall continue cell re-selection related measurements as well as cell re-selection evaluation.

Advantages of the fourth solution: Compared to previous solutions, the UE only bothers about the handling of the idle/inactive measurement configuration when it transitions to inactive, and not idle.

1.3.5 Fifth Solution: Keep Idle/Inactive Measurement Configurations when Entering RRC_CONNECTED when Performing Idle/Inactive Measurements In the fifth solution, while the timer (e.g., T331) controlling measurements in the power saving state (e.g. INACTIVE, IDLE, etc.) is running, the UE tries to resume an RRC connection (e.g., by transmitting an RRC Resume Request like message). In response, the UE receives an RRC Resume like message (e.g., RRCResume) and enters the CONNECTED state. Upon receiving the RRC Resume like message while the timer is running, the UE stops the timer T331 (or equivalent), thereby stopping performing the measurements, and stores the measurement configuration(s) for the power saving state (e.g. for early measurement reporting).

In some embodiments, the inactive/idle measurement configuration(s) may be stored in a UE variable.

In some embodiments, when the UE in CONNECTED receives an RRC Release message, the UE restores the idle/inactive measurement configuration. If the RRC Release message does not contain an idle/inactive measurement configuration, the UE resumes the restored configuration; otherwise, if the RRC Release message contains an idle/inactive measurement configuration, delta signaling applies. This could be useful in case the UE triggers a NAS signaling procedure in INACTIVE state e.g. a Tracking Area Update that requires the UE to enter CONNECTED for a short time. Then, with this solution, network would not need to re-configure the idle/inactive measurements.

Advantages of the fifth solution: Compared to the conventional solution, whenever a UE is configured to perform idle mode measurements in a power saving mode (INACTIVE, IDLE, etc.), the UE would store these configurations, allowing the network to release the UE back to a power saving mode without a need to signal the idle mode measurement configurations.

2 Network Methods

Figure 11:
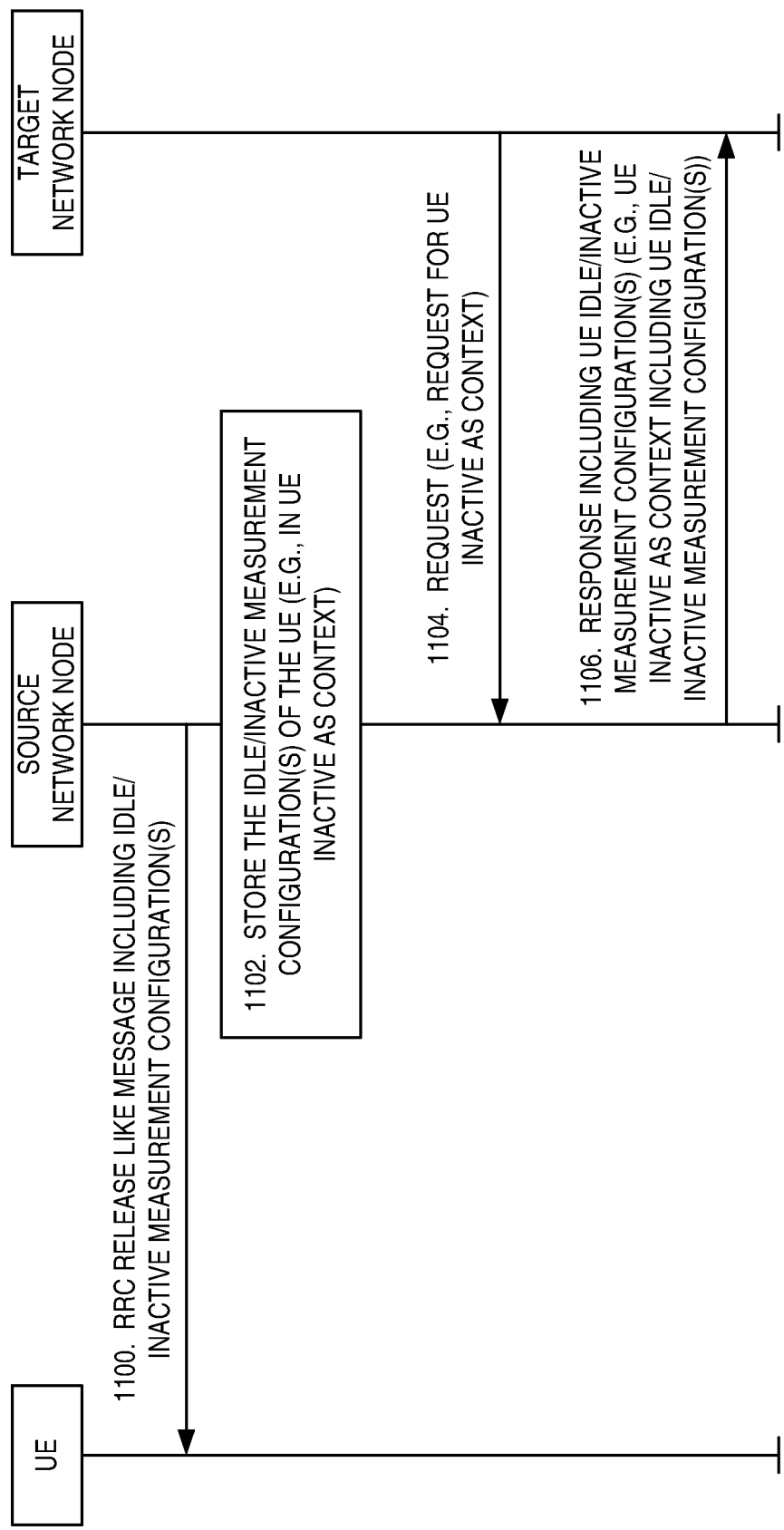
FIG. 11 illustrate the operation of a source network node in accordance with some embodiments of the present disclosure.

Embodiments of a method performed by (i.e., executed by) a source network node are also disclosed herein. In general, the method performed by a source network node comprises, as illustrated in FIG. 11:

Step 1100: The source network node provides, to a UE in CONNECTED state, an RRC Release like message (e.g., an RRCRelease) (with a suspend configuration indicating that the UE is to transition to INACTIVE state or without a suspend configuration indicating that the UE shall transition to IDLE), where the RRC Release like message contains a measurement configuration for idle/inactive measurements e.g. for early measurement reporting. Note that, in an alternative embodiment, the UE could also get the measurement configuration(s) for idle/inactive measurements while the UE is in Idle/Inactive state in the 2-step resume/release procedure described herein—i.e., the UE enters RRC INACTIVE without configurations, the UE attempts to resume by transmitting RRCResumeRequest, and the network responds with RRCRelease including measurement configurations. In that case, the UE never entered connected mode.

Step 1102: The source network node stores the idle/inactive measurement configuration of the UE in the UE Inactive AS Context;

Step 1104: The source network node receives a request from a target network node to retrieve the UE Inactive AS Context.

Step 1106: The source network node retrieves the UE Inactive AS context of the UE and (e.g., if the UE is verified) provides the context to the target node.

Figure 12:
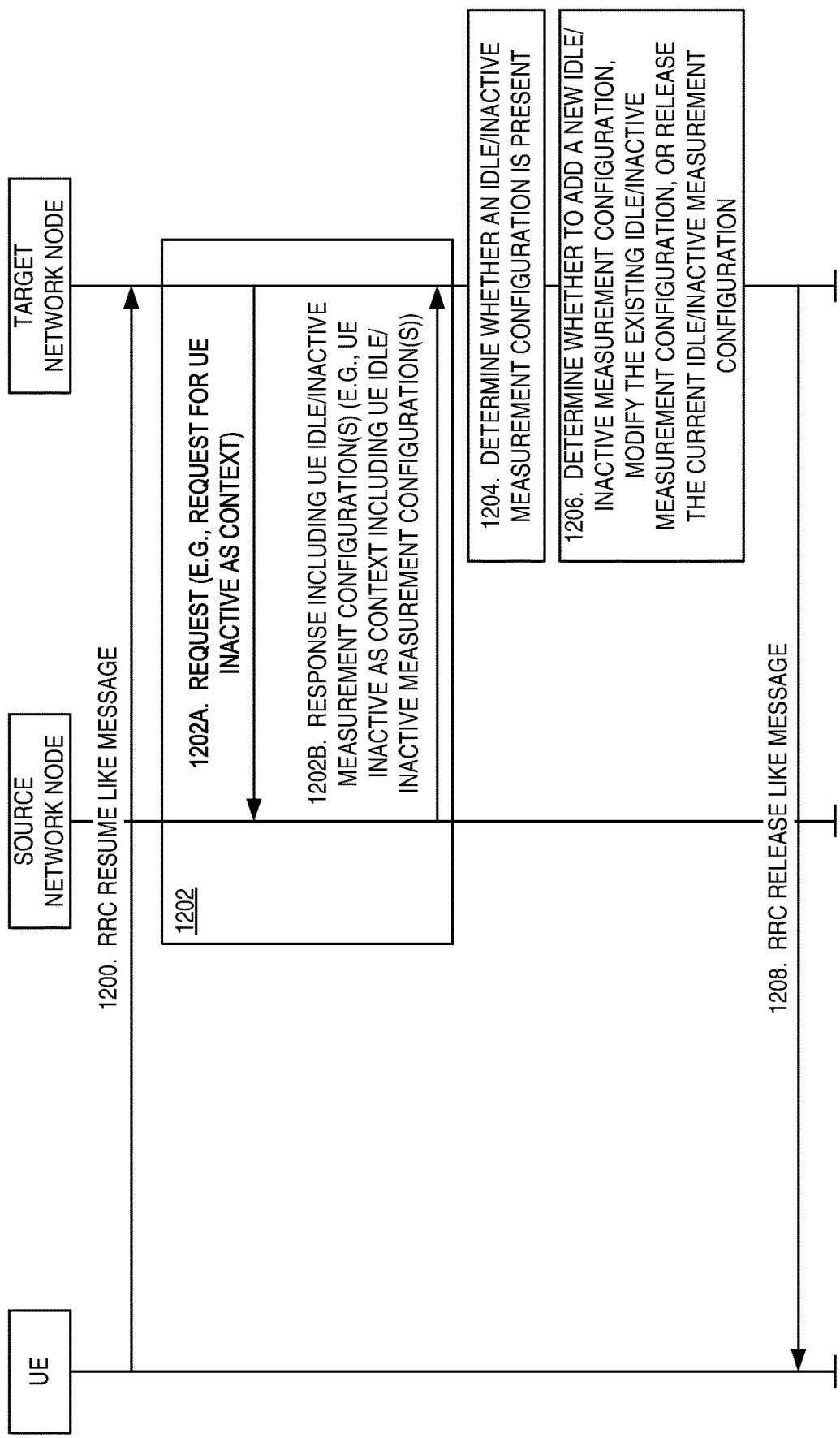
FIG. 12 illustrate the operation of a target network node in accordance with some embodiments of the present disclosure.

Embodiments of a method performed by (i.e., executed by) a target network node are also disclosed herein. In general, the method performed by a target network node comprises, as illustrated in FIG. 12:

Step 1200: The target network node receives a Resume Request message from an inactive UE.

Step 1202: The target network node retrieves the UE Inactive AS Context from a source network node or, identifying that the context is stored in the target node. In the illustrated embodiment, the target network node sends a request to the source network node for the UE Inactive AS context (step 1202A) and, in response, receives the UE Inactive AS context from the source network node (step 1202B).

Step 1204: The target network node determines whether an idle/inactive measurement configuration of the UE is present in the UE Inactive AS context.

Step 1206: If an idle/inactive measurement configuration of the UE is present in the UE Inactive AS context, the target network node determines whether the Inactive/Idle measurement configuration of the UE should be added, modified or released (e.g., according to any of the solutions described above for handling the measurement configurations) in an RRC Release message to the UE.

Step 1208: If so, the target network node sends the appropriate RRC Release message to the UE.

3 Additional Aspects

Figure 13:
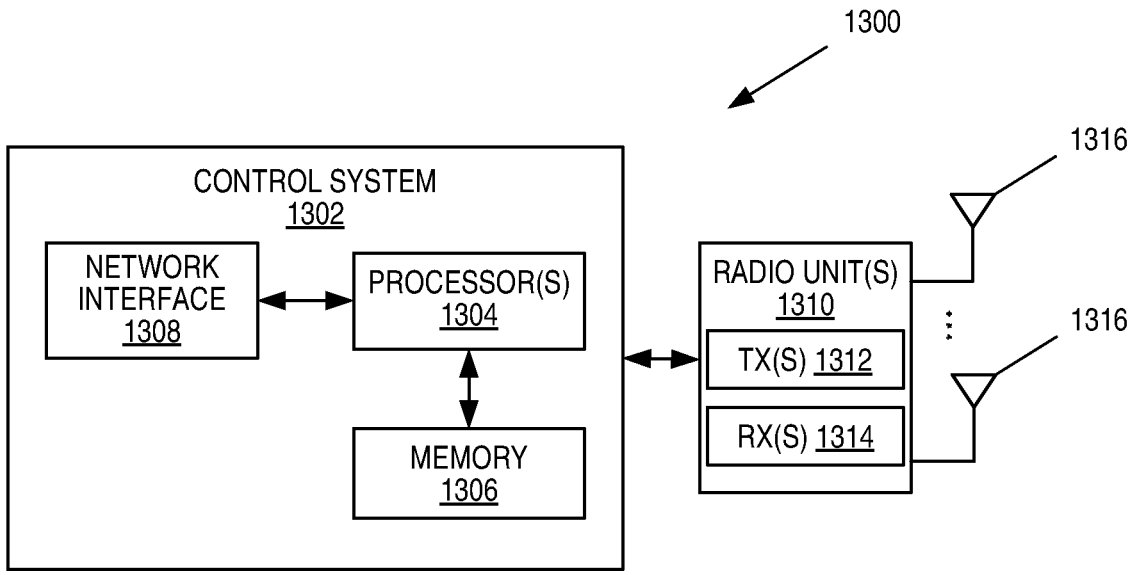
FIGS. 13 through 15 are schematic block diagrams of example embodiments of a radio access node.

FIG. 13 is a schematic block diagram of a radio access node 1300 according to some embodiments of the present disclosure. The radio access node 1300 may be, for example, a base station 902 or 906. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 (e.g., one or more functions of a network node described herein, e.g., as illustrated in FIGS. 10 through 12) as described herein. In some embodiments, the function(s) are implemented in software that is stored, e.g., in the memory 1306 and executed by the one or more processors 1304.

Figure 14:
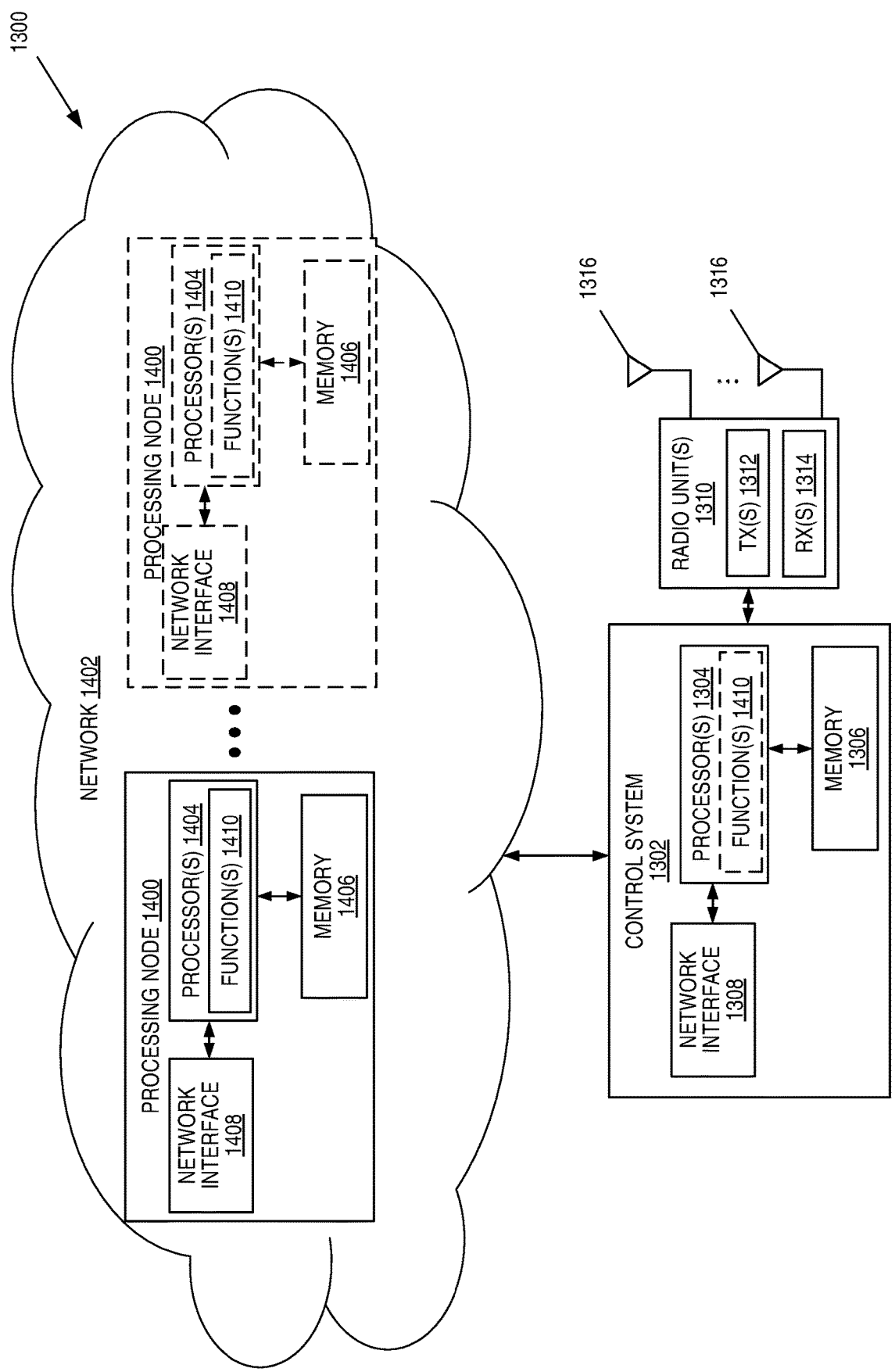

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the radio access node 1300 described herein (e.g., one or more functions of a network node described herein, e.g., as illustrated in FIGS. 10 through 12) are implemented at the one or more processing nodes 1400 or distributed across the control system 1302 and the one or more processing nodes 1400 in any desired manner. In some particular embodiments, some or all of the functions 1410 of the radio access node 1300 described herein (e.g., one or more functions of a network node described herein, e.g., as illustrated in FIGS. 10 through 12) are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 (e.g., one or more functions of a network node described herein, e.g., as illustrated in FIGS. 10 through 12) or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
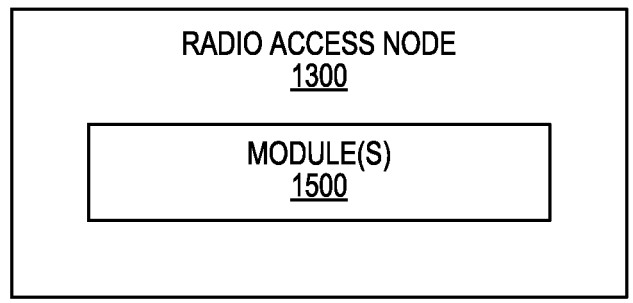

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein (e.g., one or more functions of a network node described herein, e.g., as illustrated in FIGS. 10 through 12). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
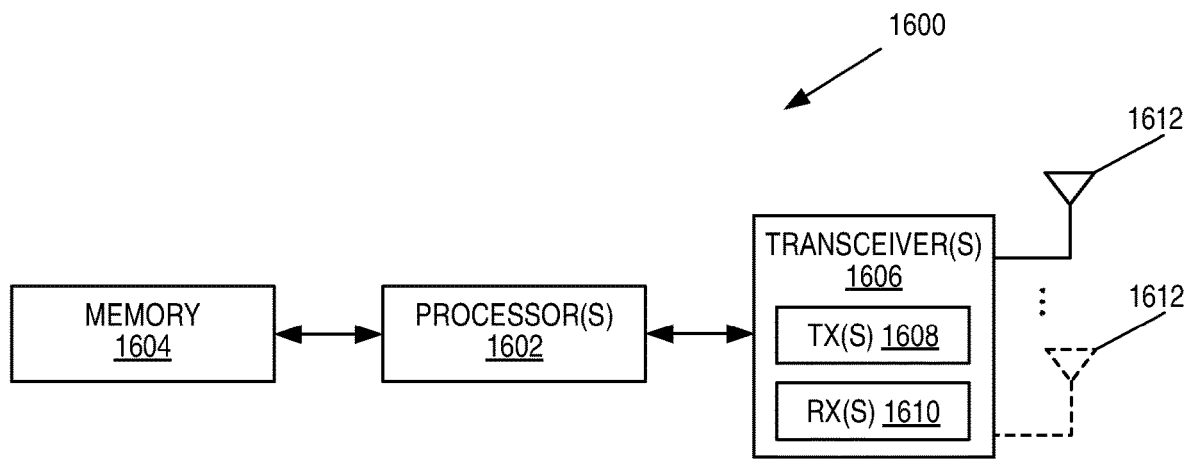
FIGS. 16 and 17 are schematic block diagrams of example embodiments of a UE.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the UE 1600 described above (e.g., one or more functions of a UE described herein, e.g., as illustrated in FIGS. 10 through 12) may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein (e.g., one or more functions of a UE described herein, e.g., as illustrated in FIGS. 10 through 12) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
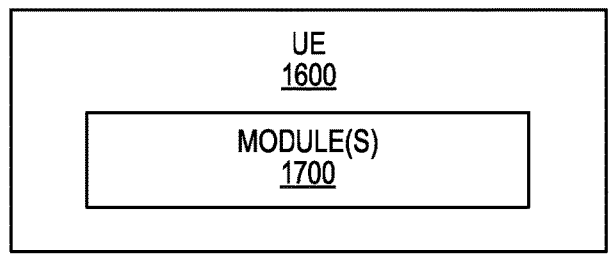

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein (e.g., one or more functions of a UE described herein, e.g., as illustrated in FIGS. 10 through 12).

Figure 18:
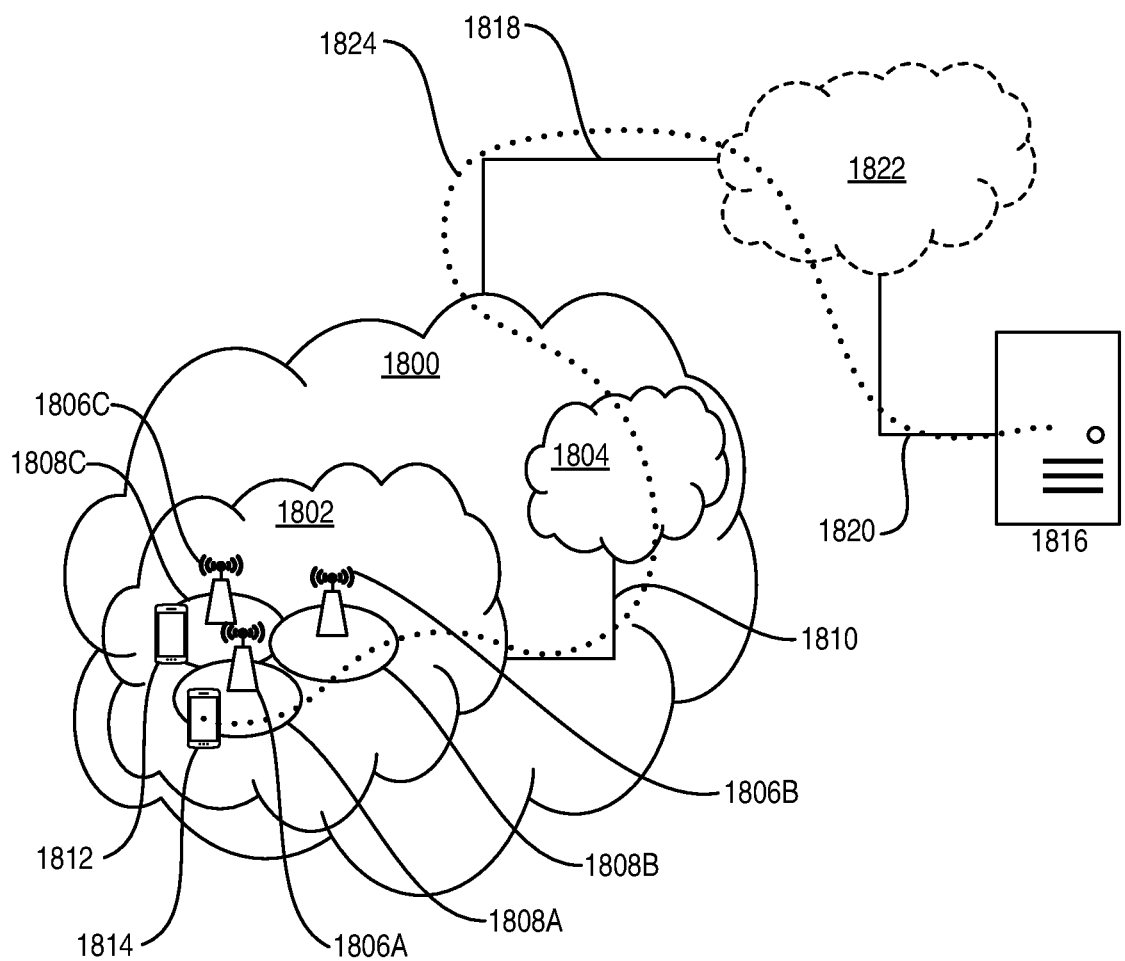
FIG. 18 illustrations another example of a system in which embodiments of the present disclosure may be implemented.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as NBs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
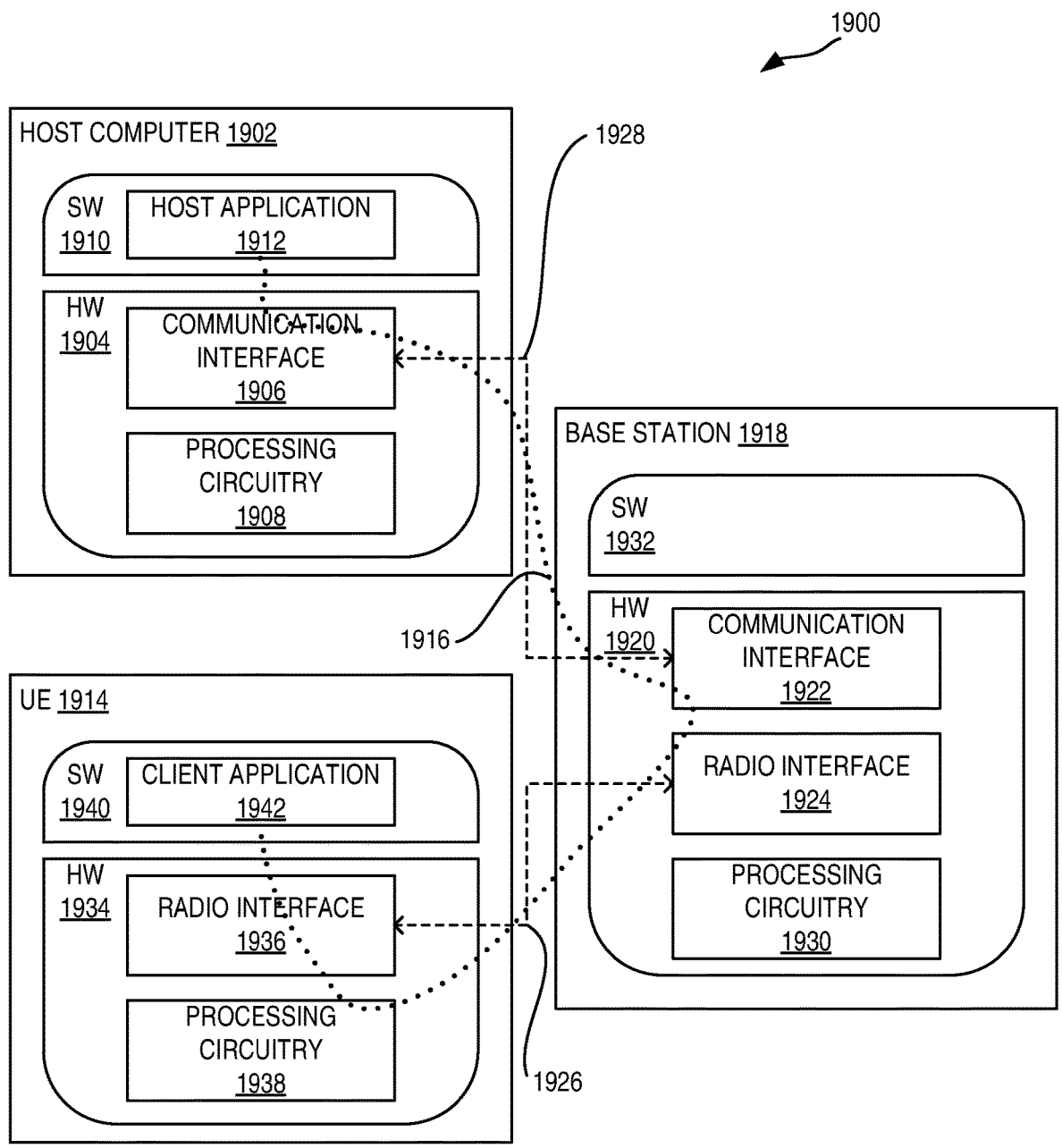
FIG. 19 illustrates example embodiments of the host computer, base station, and UE of FIG. 18.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

Figures 20, 21:
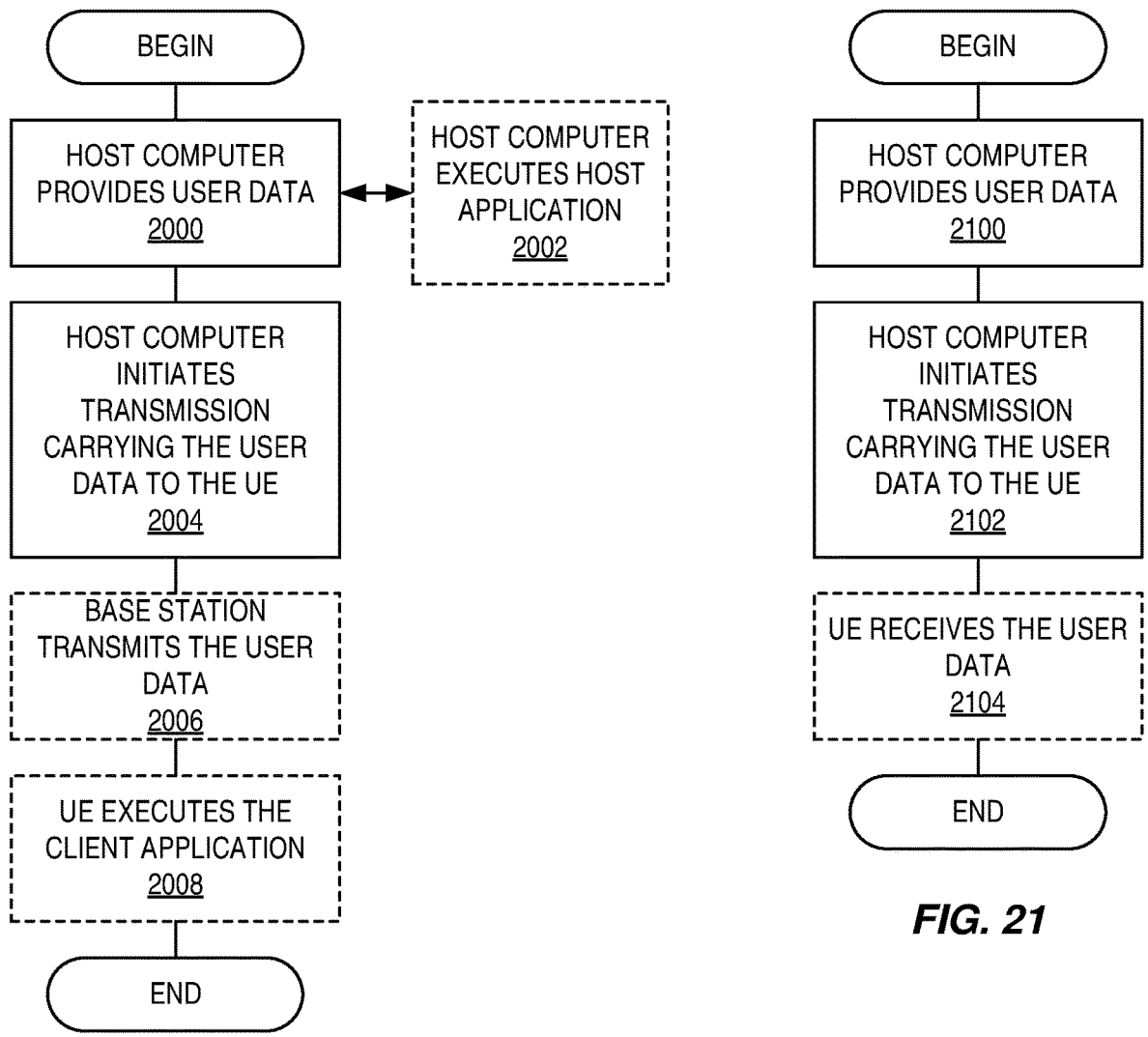

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device for handling at least one measurement configuration for a power saving state (e.g., idle/inactive state), the method comprising:
receiving (1000) at least one measurement configuration for a power saving state;
performing (1002) measurements in the power saving state in accordance with the at least one measurement configuration;
while performing (1002) the measurements in the power saving state:
receiving (1004, 1004B) a message from a network node; and
a performing (1004, 1004C) one or more actions to handle the at least one measurement configuration (e.g., upon receiving the message).

Embodiment 2: The method of embodiment 1 wherein the message received from the network node is a message that indicates to the wireless device that it is to remain in the power saving state or transition to another power saving state.

Embodiment 3: The method of embodiment 1 wherein the message received from the network node is an RRC Release like message (e.g., an RRCRelease message or an RRCConnectionRelease message).

Embodiment 4: The method of embodiment 1 further comprising, while performing (1002) the measurements in the power saving state: sending (1004A), to the network node, an RRC Resume Request like message (e.g., an RRCResumeRequest or RRCResumeRequest1 or RRCConnectionResumeRequest); wherein receiving (1004, 1004B) the message from the network node comprises receiving (1004B), from the network node, an RRC Release like message (e.g., an RRCRelease message or RRCConnectionRelease).

Embodiment 5: The method of embodiment 4 wherein performing (1004, 1004C) the one or more actions to handle the at least one measurement configuration comprises: stop performing measurements in the power saving state in accordance with the at least one measurement configuration (e.g., by stopping an associated timer); and performing a set of cleaning actions (e.g., releasing the at last one measurement configuration and the measurements performed in accordance with the at least one measurement configuration).

Embodiment 6: The method of embodiment 4 wherein the RRC Release like message does not contain a measurement configuration for measurements in a power saving state, and performing (1004, 1004C) the one or more actions to handle the at least one measurement configuration comprises: keeping the at least one measurement configuration and the measurements performed in accordance with the at least one measurement configuration; and continuing to perform measurements in accordance with the at least one measurement configuration (e.g., by not stopping an associated timer).

Embodiment 7: The method of embodiment 4 wherein the RRC Release like message does contain a measurement configuration for measurements in a power saving state, and performing (1004, 1004C) the one or more actions to handle the at least one measurement configuration comprises: stop performing measurements in the power saving state in accordance with the at least one measurement configuration (e.g., by stopping an associated timer); and performing a set of cleaning actions (e.g., releasing the at last one measurement configuration and the measurements performed in accordance with the at least one measurement configuration).

Embodiment 8: The method of embodiment 4 wherein the RRC Release like message does contain a measurement configuration for measurements in a power saving state, and performing (1004, 1004C) the one or more actions to handle the at least one measurement configuration comprises at least one of the following actions: adding a new entry in the at least one measurement configuration based on the measurement configuration contained in the RRC Release like message; modifying the at least one measurement configuration (e.g., modifying at least one field) based on the measurement configuration contained in the RRC Release like message; and removing an existing entry in the at least one measurement configuration based on the measurement configuration contained in the RRC Release like message.

Embodiment 9: The method of embodiment 4 wherein the RRC Release like message comprises an indication that the UE is to remain in the power saving state, and performing (1004, 1004C) the one or more actions to handle the at least one measurement configuration comprises: performing one or more actions in accordance with any one of embodiments 5 to 8.

Embodiment 10: The method of embodiment 4 wherein the RRC Release like message does not comprise an indication (e.g., a suspendConfig) that the UE is to remain in the power saving state, and performing (1004, 1004C) the one or more actions to handle the at least one measurement configuration comprises: stop performing measurements in the power saving state in accordance with the at least one measurement configuration (e.g., by stopping an associated timer); and performing a set of cleaning actions (e.g., releasing the at last one measurement configuration and the measurements performed in accordance with the at least one measurement configuration).

Embodiment 11: The method of embodiment 1 wherein the message received from the network node is an RRC Resume like message (e.g., an RRCResume message).

Embodiment 12: The method of embodiment 1 further comprising, while performing (1002) the measurements in the power saving state: sending (1004A), to the network node, an RRC Resume Request like message (e.g., an RRCResumeRequest); wherein receiving (1004, 1004B) the message from the network node comprises receiving (1004B), from the network node, an RRC Resume like message (e.g., an RRCResume message).

Embodiment 13: The method of embodiment 12 wherein performing (1004, 1004C) the one or more actions to handle the at least one measurement configuration comprises: stop performing measurements in the power saving state in accordance with the at least one measurement configuration (e.g., by stopping an associated timer); and storing the at least one measurement configuration for the power saving state.

Embodiment 14: The method of any of the previous embodiments, further comprising: providing user data; and forwarding the user data to a host computer via the transmission to the base station.

Group B Embodiments

Embodiment 15: A method performed by a network node (e.g., a base station), the method comprising: providing (1100), to a wireless device, an RRC Release like message comprising at least one measurement configuration for a power saving state (e.g., idle/inactive); storing (1102) the at least one measurement configuration (e.g., an UE Inactive AS Context of the wireless device); receiving (1104) a request from another network node; and in response to the request, sending (1106), to the other network node, information (e.g., the UE Inactive AS Context of the wireless device) comprising the at least one measurement configuration.

Embodiment 16: A method performed by a network node (e.g., a base station), the method comprising:
receiving (1200), from a wireless device in a power saving state (e.g., inactive state), a resume request like message;
retrieving (1202) information regarding the wireless device (e.g., a UE Inactive AS Context of the wireless device) from another network node;
determining (1204) that a measurement configuration of the wireless device for measurements in the power saving state is present in the information;
determining (1206) at least one of:
that the measurement configuration of the wireless device is to be modified;
that the measurement configuration of the wireless device is to be released; or
that a new measurement configuration for the wireless device for measurements in the power saving state is to be added; and
sending (1208) a message (e.g., an RRC Release like message) to the wireless device in accordance with a result of the determining (1206).

Embodiment 16: The method of any of the previous embodiments, further comprising: obtaining user data; and forwarding the user data to a host computer or a wireless device.

Group C Embodiments

Embodiment 18: A wireless device, the wireless device comprising: processing circuitry configured to perform any of the steps of any of the Group A embodiments; and power supply circuitry configured to supply power to the wireless device.

Embodiment 19: A base station, the base station comprising: processing circuitry configured to perform any of the steps of any of the Group B embodiments; and power supply circuitry configured to supply power to the base station.

Embodiment 20: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 21: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 22: The communication system of the previous embodiment further including the base station.

Embodiment 23: The communication system of the previous 2 embodiments, further including the UE, wherein the UE is configured to communicate with the base station.

Embodiment 24: The communication system of the previous 3 embodiments, wherein: the processing circuitry of the host computer is configured to execute a host application, thereby providing the user data; and the UE comprises processing circuitry configured to execute a client application associated with the host application.

Embodiment 25: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 26: The method of the previous embodiment, further comprising, at the base station, transmitting the user data.

Embodiment 27: The method of the previous 2 embodiments, wherein the user data is provided at the host computer by executing a host application, the method further comprising, at the UE, executing a client application associated with the host application.

Embodiment 28: A User Equipment, UE, configured to communicate with a base station, the UE comprising a radio interface and processing circuitry configured to perform the method of the previous 3 embodiments.

Embodiment 29: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 30: The communication system of the previous embodiment, wherein the cellular network further includes a base station configured to communicate with the UE.

Embodiment 31: The communication system of the previous 2 embodiments, wherein: the processing circuitry of the host computer is configured to execute a host application, thereby providing the user data; and the UE's processing circuitry is configured to execute a client application associated with the host application.

Embodiment 32: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 33: The method of the previous embodiment, further comprising at the UE, receiving the user data from the base station.

Embodiment 34: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 35: The communication system of the previous embodiment, further including the UE.

Embodiment 36: The communication system of the previous 2 embodiments, further including the base station, wherein the base station comprises a radio interface configured to communicate with the UE and a communication interface configured to forward to the host computer the user data carried by a transmission from the UE to the base station.

Embodiment 37: The communication system of the previous 3 embodiments, wherein: the processing circuitry of the host computer is configured to execute a host application; and the UE's processing circuitry is configured to execute a client application associated with the host application, thereby providing the user data.

Embodiment 38: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 39: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 40: The method of the previous embodiment, further comprising, at the UE, providing the user data to the base station.

Embodiment 41: The method of the previous 2 embodiments, further comprising: at the UE, executing a client application, thereby providing the user data to be transmitted; and at the host computer, executing a host application associated with the client application.

Embodiment 42: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 43: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 44: The communication system of the previous embodiment further including the base station.

Embodiment 45: The communication system of the previous 2 embodiments, further including the UE, wherein the UE is configured to communicate with the base station.

Embodiment 46: The communication system of the previous 3 embodiments, wherein: the processing circuitry of the host computer is configured to execute a host application; and the UE is configured to execute a client application associated with the host application, thereby providing the user data to be received by the host computer.

Embodiment 47: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 48: The method of the previous embodiment, further comprising at the base station, receiving the user data from the UE.

Embodiment 49: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
5G-S-TMSI 5G System Architecture Evolution Temporary Mobile Subscriber Identity
AP Access Point
ARFCN Absolute Radio Frequency Channel Number
AS Access Stratum
ASIC Application Specific Integrated Circuit
CA Carrier Aggregation
CE Control Element
CN Core Network
CPU Central Processing Unit
DC Dual Connectivity
DRX Discontinuous Reception
DSP Digital Signal Processor
eLTE Enhanced Long Term Evolution
eNB Enhanced or Evolved Node B
EN-DC Evolved Universal Terrestrial Radio Access Network New Radio Dual Connectivity
EPC Evolved Packet Core
E-UTRA Evolved Universal Terrestrial Radio Access
E-UTRAN Evolved Universal Terrestrial Radio Access Network
FPGA Field Programmable Gate Array
gNB New Radio Base Station
ID Identity
IE Information Element
I-RNTI Inactive Radio Network Temporary Identifier LTE Long Term Evolution
MAC Medium Access Control
MCG Master Cell Group
MeNB Master Enhanced or Evolved Node B
MME Mobility Management Entity
MR-DC Multi-Radio Dual Connectivity
ms Millisecond
MTC Machine Type Communication
NAS Non-Access Stratum
NE New Radio Evolved Universal Terrestrial Radio Access
NGEN-DC Next Generation Dual Connectivity
NG-RAN Next Generation Radio Access Network
NR New Radio
OTT Over-the-Top
PCell Primary Cell
PCI Physical Cell Identity
P-GW Packet Data Network Gateway
PSCell Primary Secondary Cell
RAM Random Access Memory
RAN Radio Access Network
RAT Radio Access Technology
RNA Radio Network Subsystem Application Part User Adaptation
RNSAP Radio Network Subsystem Application Part
ROM Read Only Memory
RRC Radio Resource Control
RRH Remote Radio Head
RRM Radio Resource Management
RSRP Reference Signal Received Power
RSRQ Reference Signal Received Quality
SA Stand-Alone
SCEF Service Capability Exposure Function
SCell Secondary Cell
SCG Secondary Cell Group
SIB System Information Block
SpCell Special Cell
SSB Synchronization Signal Block
TS Technical Specification
UE User Equipment
WID Work Item Description Those skilled in the art will recognize improvements and modifications to the embodiments of the present disclosure. All such improvements and modifications are considered within the scope of the concepts disclosed herein.

What is claimed is:

1. A method performed by a wireless device configured to communicate with a network node, the method comprising:
while in a power saving state and while a timer for performing measurements is running;
performing first measurements in accordance with a first measurement configuration;
sending to the network node a request to resume operation in a radio resource control (RRC) connected state;
receiving an RRC release message from the network node;
when the RRC release message includes a second measurement configuration, stopping the timer, releasing the first measurements and the first measurement configuration, and performing measurements according to the second method configuration; and
when the RRC release message does not include a second measurement configuration, allowing the timer to continue running and continuing to perform first measurements in accordance with the first measurement configuration.

2. The method of claim 1 wherein the message received from the network node is a message that one of includes and does not include a measurement configuration for measurements in the power saving state.

3. The method of claim 1 wherein the message received from the network node is a message that indicates to the wireless device that the wireless device is one of to remain in the power saving state and to transition to another power saving state.

4. The method of claim 1 wherein the message received from the network node is an RRC Release message.

5. The method of claim 4 wherein the RRC Release message is one of an RRCRelease message and an RRCConnectionRelease message.

6. The method of claim 1 further comprising, while performing the measurements in the power saving state:
sending, to the network node, an RRC Resume Request like message;
wherein receiving the message from the network node comprises receiving, from the network node, an RRC Release message.

7. The method of claim 6 wherein the RRC Resume Request like message is one of an RRCResumeRequest, a RRCResumeRequest1 and RRCConnectionResumeRequest, and the RRC Release message is one of an RRCRelease message and an RRCConnectionRelease message.

8. The method of claim 6 wherein the RRC Release message does contain a measurement configuration for measurements in a power saving state, and performing one or more actions to handle the first measurement configuration, the measurements and both the measurement configuration and the measurements comprises at least one of the following actions:
adding a new entry in the first measurement configuration based on the measurement configuration contained in the RRC Release message;
modifying the first measurement configuration based on the measurement configuration contained in the RRC Release message; and
removing an existing entry in the first measurement configuration based on the measurement configuration contained in the RRC Release message.

9. A wireless device in communication with a network node, the wireless device configured to:
while in a power saving state and while a timer for performing measurements is running;
perform first measurements in accordance with a first measurement configuration;
send to the network node a request to resume operation in a radio resource control (RRC) connected state;
receive an RRC release message from the network node;
when the RRC release message includes a second measurement configuration, stopping the timer, releasing the first measurements and the first measurement configuration, and performing measurements according to the second method configuration; and
when the RRC release message does not include a second measurement configuration, allowing the timer to continue running and continuing to perform first measurements in accordance with the first measurement configuration.

10. The wireless device of claim 9 wherein the RRC Release message received from the network node is a message that one of includes and does not include a measurement configuration for measurements in the power saving state.

11. The wireless device of claim 9 wherein the wireless device comprises:
one or more transmitters;
one or more receivers; and
processing circuitry associated with the one or more transmitters and the one or more receivers, the processing circuitry configured to cause the wireless device to:
receive the first measurement configuration for the power saving state;
perform the measurements in the power saving state in accordance with the first measurement configuration;
while performing the measurements in the power saving state:
receive the message from the network node; and
perform one or more actions to handle at least one of:
the first measurement configuration;
the measurements; and
both the first measurement configuration and the measurements,
upon receiving the message.

12. A method performed by a network node configured to communicate with a wireless device (WD), the method comprising:
receiving from the WD a request to resume operation in a radio resource control (RRC) connected state;
providing, to a wireless device, an RRC Release message;
configuring the WD to stop a timer and release first measurements and a prior measurement configuration when the RRC Release message includes a first measurement configuration;
configuring the WD to allow the timer to continue running and continue performing first measurements in accordance with the prior measurement configuration when the RRC Release message does not include the first measurement configuration;
storing the first measurement configuration;
receiving a request from another network node; and
in response to the request, sending, to the other network node, information comprising the first measurement configuration.

13. The method of claim 12 wherein storing the first measurement configuration comprises storing the measurement configuration in an inactive access stratum context of the wireless device.

14. The method of claim 13 wherein sending the information to the other network node comprises sending the inactive access stratum context of the wireless device to the other network node.

15. The method of claim 12 wherein the wireless device is attempting to resume a connection with the other network node.

16. A network node configured to communicate with a wireless device (WD), the network node configured to:
receive from the WD a request to resume operation in a radio resource control (RRC) connected state;
provide to a wireless device, an RRC Release message comprising a first measurement configuration;
configure the WD to stop a timer and release first measurements and a prior measurement configuration when the RRC Release message includes a first measurement configuration;
configure the WD to allow the timer to continue running and continue performing first measurements in accordance with the prior measurement configuration when the RRC Release message does not include the first measurement configuration
store the first measurement configuration;
receive a request from another network node; and
in response to the request, send, to the other network node, information comprising the first measurement configuration.

17. The network node of claim 16 wherein the storing the first measurement configuration comprises storing the first measurement configuration in an inactive access stratum context of the wireless device.

18. The network node of claim 16 wherein the network node comprises processing circuitry configured to cause the network node to:
provide, to the wireless device, the RRC Release message comprising the first measurement configuration for the power saving state;
store the first measurement configuration;
receive the request from another network node; and
in response to the request, send, to the other network node, the information comprising the first measurement configuration.

* * * * *